US010625631B2

(12) United States Patent
Baccouche et al.

(10) Patent No.: US 10,625,631 B2
(45) Date of Patent: Apr. 21, 2020

(54) UNDERBODY STRUCTURE FOR ADJUSTABLE SEATING ASSEMBLY

(71) Applicant: FORD GLOBAL TECHNOLOGIES, LLC, Dearborn, MI (US)

(72) Inventors: Mohamed Ridha Baccouche, Ann Arbor, MI (US); Rahul Arora, Birmingham, MI (US); Johnathan Andrew Line, Northville, MI (US); Marcos Silva Kondrad, Macomb Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 43 days.

(21) Appl. No.: 16/011,695

(22) Filed: Jun. 19, 2018

(65) Prior Publication Data

US 2019/0126783 A1    May 2, 2019

Related U.S. Application Data

(63) Continuation-in-part of application No. 15/798,528, filed on Oct. 31, 2017, now Pat. No. 10,421,373.

(51) Int. Cl.
*B60N 2/14*    (2006.01)
*B60N 2/07*    (2006.01)
*B60N 2/02*    (2006.01)
*B60N 2/06*    (2006.01)

(52) U.S. Cl.
CPC ........... *B60N 2/143* (2013.01); *B60N 2/0292* (2013.01); *B60N 2/06* (2013.01); *B60N 2/0742* (2013.01); *B60N 2002/022* (2013.01); *B60N 2002/0216* (2013.01)

(58) Field of Classification Search
CPC .......... B60N 2/005; B60N 2/04; B60N 2/062; B60N 2/0742; B60N 2/14; B60N 2/143
USPC .......................... 296/64, 65.01, 65.06, 65.07
See application file for complete search history.

(56) References Cited

U.S. PATENT DOCUMENTS

| | | |
|---|---|---|
| 2,426,582 A | 9/1947 | Austin |
| 5,000,505 A | 3/1991 | Kawashita et al. |
| 5,951,106 A | 9/1999 | Hirama et al. |
| 6,168,234 B1 | 1/2001 | Haynes et al. |
| 6,666,514 B2 | 12/2003 | Muraishi et al. |
| 6,981,746 B2 | 1/2006 | Chung et al. |
| 7,108,325 B2 | 9/2006 | Williamson et al. |
| 7,341,302 B2 | 3/2008 | Slade |
| 7,357,451 B2 | 4/2008 | Bendure et al. |
| 7,380,859 B2 | 6/2008 | Gardiner |
| 7,658,258 B2 | 2/2010 | Denney |
| 7,950,740 B2 | 5/2011 | Bunea et al. |
| 9,114,730 B1 | 8/2015 | Hudson et al. |
| 2003/0141736 A1* | 7/2003 | Chernoff ................... B60N 2/01 296/65.01 |

(Continued)

*Primary Examiner* — Jason S Daniels
(74) *Attorney, Agent, or Firm* — David Coppiellie; Price Heneveld LLP

(57) ABSTRACT

An underbody structure for supporting an adjustable seating assembly for a motor vehicle comprises a rotatable turntable operably coupled to an underbody of the motor vehicle and a brace operably coupled with the rotatable turntable and the underbody of the motor vehicle and extending substantially across the rotatable turntable, wherein the adjustable seating assembly is operably coupled to the brace and the underbody of the motor vehicle.

19 Claims, 18 Drawing Sheets

(56) References Cited

U.S. PATENT DOCUMENTS

2009/0152907 A1* 6/2009 Lee .................... B60N 2/01
297/1
2009/0195037 A1 8/2009 Plavetich et al.
2017/0182914 A1* 6/2017 Lonstein ............. B60N 2/0232

* cited by examiner

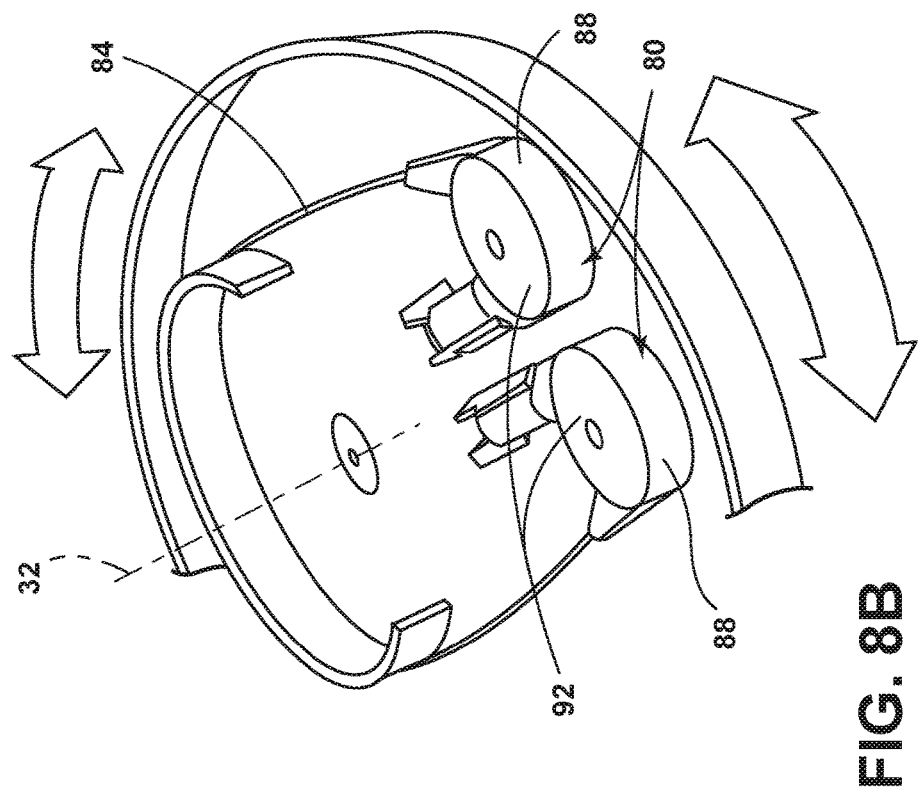
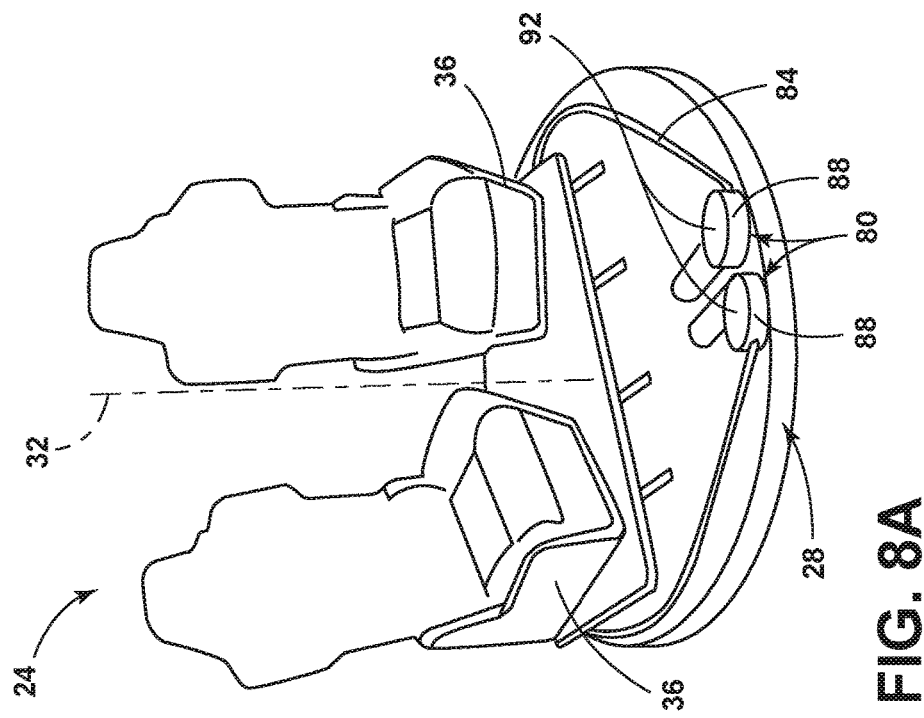

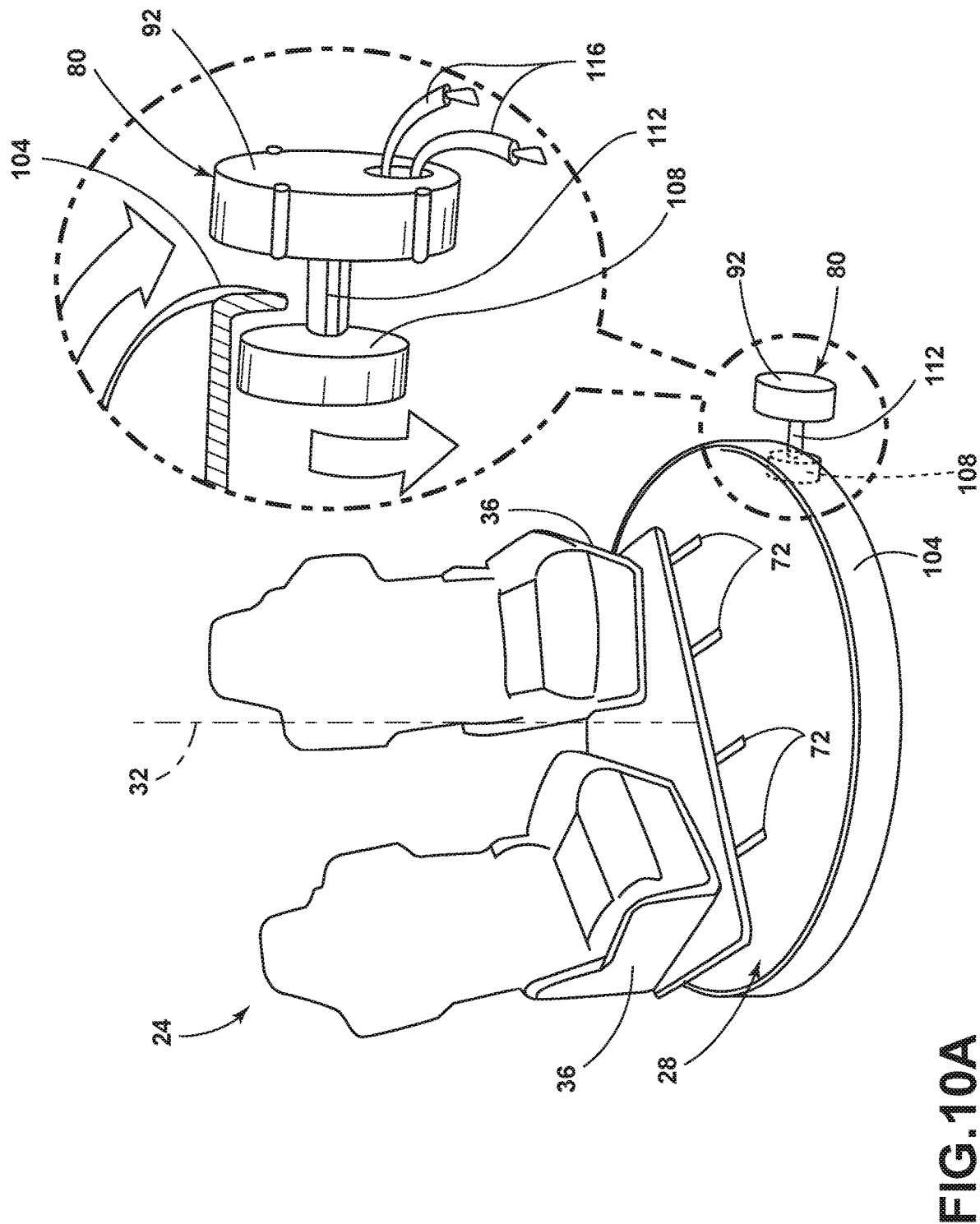

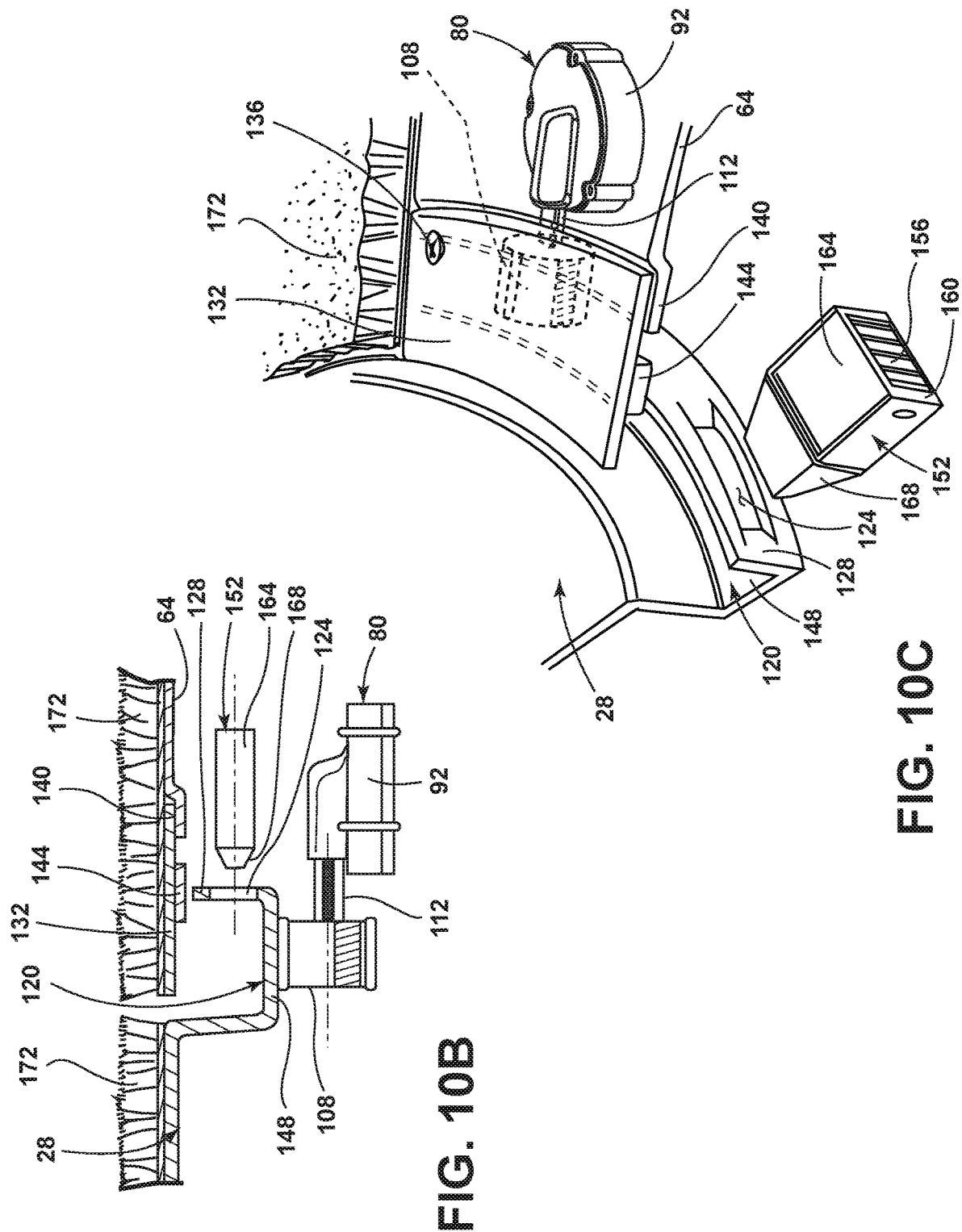

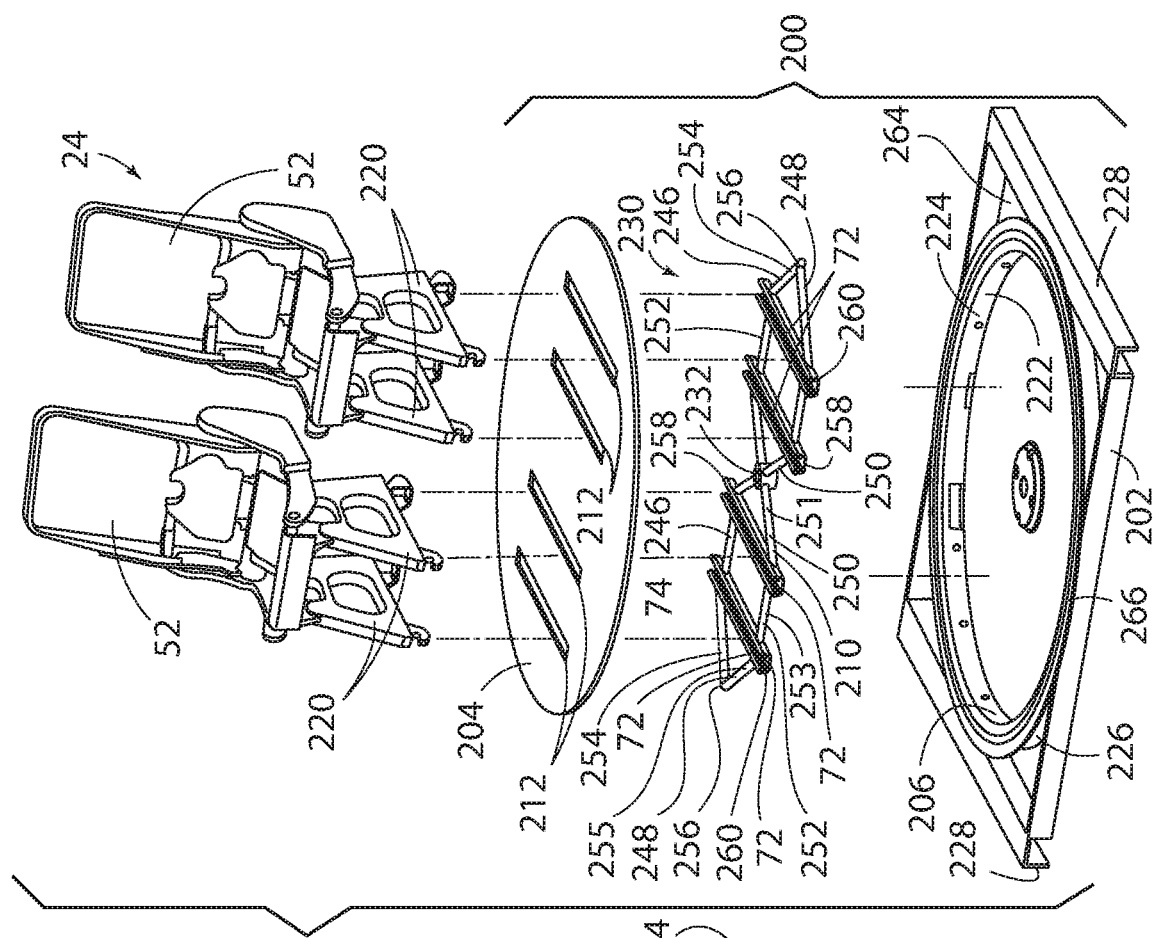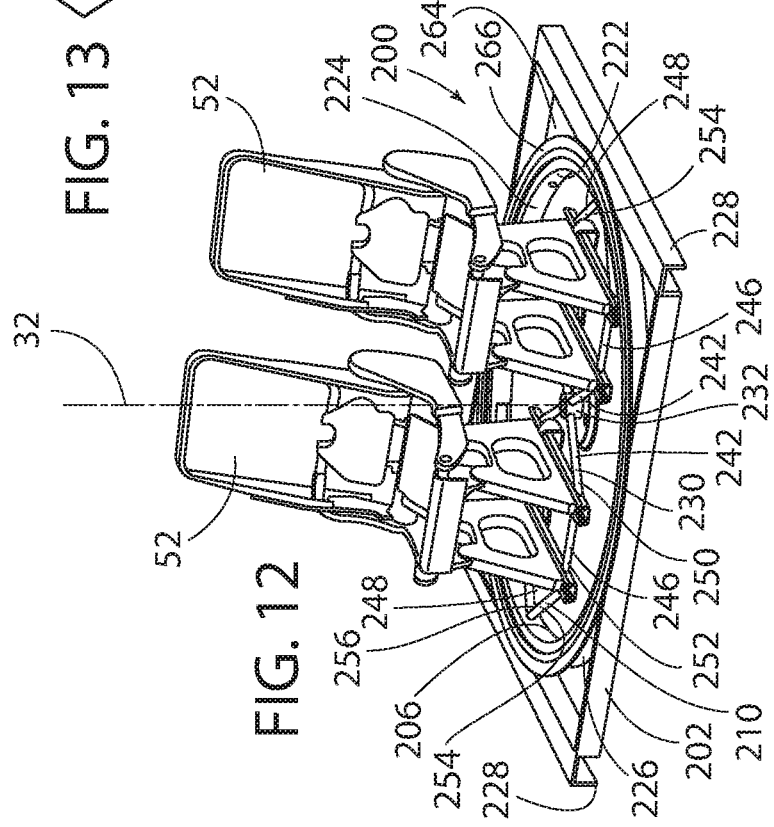

UNDERBODY STRUCTURE FOR ADJUSTABLE SEATING ASSEMBLY

CLAIM OF PRIORITY

This application is a continuation-in-part of and claims priority under 35 U.S.C. § 120 to commonly assigned, co-pending, and related U.S. patent application Ser. No. 15/798,528 filed Oct. 31, 2017, entitled ADJUSTABLE SEATING ASSEMBLY, the entire disclosure of which is incorporated herein by reference.

FIELD OF THE DISCLOSURE

The present disclosure generally relates to an underbody structure for supporting an adjustable seating assembly. More specifically, the present disclosure relates to an underbody structure that supports an adjustable seating assembly mounted on a rotatable turntable.

BACKGROUND OF THE INVENTION

Seating assemblies are typically provided with primarily fore and aft adjustment of the adjustable seating assembly relative to a fixed support surface. However, users desire additional adjustability and/or functionality for the adjustable seating assembly. Accordingly, there is a need for seating assemblies that provide additional adjustability and flexibility in multiple configurations for improved user experience.

However, in prior seating assemblies, traditional underbodies were characterized by the use of tunnels, runners and cross members that do not readily allow for configurable seating assemblies. A new lightweight underbody load path architecture capable of transferring impact loads, managing impact energy, and protecting occupants in various seating configurations at minimal cost and weight is desired.

SUMMARY OF THE INVENTION

According to a first aspect of the present disclosure, an underbody structure for supporting an adjustable seating assembly for a motor vehicle includes a rotatable turntable operably coupled to an underbody of the motor vehicle. A brace is operably coupled with the rotatable turntable and the underbody of the motor vehicle and extends substantially across the rotatable turntable. The adjustable seating assembly is operably coupled to the brace and to the underbody of the motor vehicle.

Embodiments of the first aspect of the present disclosure can include any one or a combination of the following features:

- the rotatable turntable comprises a rotatable circular platform disposed above a recess within which the brace is received, the recess having an annular side wall defining an interior surface operably coupled with the brace and an exterior surface operably coupled with a side structure of the motor vehicle;
- the side structure of the motor vehicle is a rocker panel or a runner;
- the brace comprises a truss-like structure;
- the truss-like structure is comprised of extruded aluminum tubes;
- the brace further comprises a central hub through which a central bolt extends to operably couple the brace to the underbody of the motor vehicle and to which the truss-like structure is attached;
- the central hub of the brace further comprises a fixed inner race and a rotatable outer race between which are disposed a plurality of ball bearings by which the brace is operably coupled with the underbody of the motor vehicle, and wherein the truss-like structure is attached to the rotatable outer race;
- guiding rollers are disposed beneath the truss-like structure and above the underbody of the motor vehicle by which the truss-like structure and the rotatable circular platform are supported;
- the truss-like structure comprises a pair of hexagonal sections, each one of the pair of hexagonal sections being disposed on opposed sides of the central hub and the adjustable seating assembly further comprises a pair of seat tracks operably coupled with and extending orthogonally between opposed segments of an intermediate portion of the truss-like structure, wherein the pair of seat tracks act are rigidly fixed to the truss-like structure;
- the truss-like structure extends between a central hub and central bolt at a center of rotation of the rotatable turntable at a proximate portion of the truss-like structure and an interior surface of an annular side wall of a recess at a distal portion of the truss-like structure, and an exterior surface of the annular side wall is operably coupled with a side structure of the motor vehicle;
- the truss-like structure comprises a central portion, an intermediate portion, and an exterior portion, wherein the intermediate portion is operably coupled with the adjustable seating assembly, the adjustable seating assembly comprising a pair of seat tracks in spaced parallel relation with each other and the intermediate portion comprising a pair of tubular members in spaced parallel relation with each other and in orthogonal relation to the pair of seat tracks, the central portion extends from a central hub rotatably coupled with a fixed central bolt to a first of the pair of seat tracks and comprises a pair of tubular members each radially extending from the central hub to the first of the pair of seat tracks, and the exterior portion extends from an external side structure of the motor vehicle to a second of the pair of seat tracks and comprises a pair of tubular members each extending from a common apex of the truss like structure proximate the exterior side structure of the motor vehicle to the second of the pair of seat tracks;
- the truss-like structure comprises a pair of trusses, each of which is operably coupled with the adjustable seating assembly, each of which is disposed on opposed sides of the central hub, and each of which is aligned across the rotatable turntable;
- the brace comprises a circular disk disposed between the rotatable circular platform and above a pan within which the circular disk is received;
- the circular disk comprises an array of raised ribs disposed on a substantially planar base and the raised ribs on the circular disk are arranged in an orthogonal pattern that comprises at least two longitudinal main raised ribs and at least two lateral main raised ribs, and wherein the adjustable seating assembly comprises a pair of seat tracks mounted to the substantially planar base and disposed proximate one of the longitudinal main raised ribs and between the two lateral main raised ribs; and
- the pan, the circular disk, and the rotatable circular platform are operably coupled and rotatably mounted to the underbody of the motor vehicle, and the pan is circular and has an annular side wall defining an interior surface operably coupled with the circular disk and an exterior surface operably coupled with a side structure of the motor vehicle.

According to a second aspect of the present disclosure, an underbody structure for supporting an adjustable seating assembly for a motor vehicle includes a brace operably coupled with the underbody of the motor vehicle. A rotatable turntable is operably coupled to the brace and the underbody of the motor vehicle and further includes a circular platform upon which the adjustable seating assembly is disposed, wherein the brace extends beneath and substantially across a diameter of the circular platform of the rotatable turntable. A circular recess is provided within which the brace is received, the circular recess having an annular side wall defining an interior surface operably coupled with the brace and an exterior surface operably coupled with a side structure of the motor vehicle.

Embodiments of the second aspect of the present disclosure can include the following feature:

the circular platform comprises a pair of parallel slots extending therethrough and through which a pair of seat tracks of the adjustable seating assembly extend and whereby the adjustable seating assembly is configured to slidably actuate between a first extended position and a second rearward-actuated position regardless of a rotational position of the rotatable turntable.

According to a third aspect of the present disclosure, an underbody structure for supporting a plurality of adjustable seating assemblies for a motor vehicle includes a rotatable turntable operably coupled to a brace and the underbody of the motor vehicle and further includes a circular platform upon which the plurality of seating assemblies are disposed. The brace extends beneath and substantially across a diameter of the circular platform of the rotatable turntable. A recess within which the brace is received is provided, where the recess has a side wall defining an interior surface operably coupled with the brace and an exterior surface operably coupled with a side structure of the motor vehicle.

Embodiments of the third aspect of the present disclosure can include any one or a combination of the following features:

the brace comprises a truss-like structure and the recess comprises a fixed circular recess having an annular side wall defining the interior surface operably coupled with the truss-like structure and the exterior surface operably coupled with a side structure of the motor vehicle; and the brace comprises a circular disk and the recess comprises a circular pan, the circular disk being disposed between the rotatable circular platform and above the circular pan within which the circular disk is received, and the circular pan being rotatably coupled with the rotatable turntable and the circular disk and further comprising an annular side wall defining the interior surface operably coupled with the brace and the exterior surface operably coupled with a side structure of the motor vehicle.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 8A is a front perspective view of the adjustable seating assembly illustrating a drive mechanism, according to one embodiment;

FIG. 8B is a front perspective view of the drive mechanism depicted in FIG. 8A illustrating a cable-driven drive mechanism, according to one embodiment;

FIG. 10A is a front perspective view of the adjustable seating assembly illustrating the drive mechanism, according to yet another embodiment;

FIG. 10B is a cross-sectional view taken along line XB-XB of FIG. 7, illustrating the drive mechanism according to a further embodiment;

FIG. 10C is a top perspective view of the drive mechanism depicted in FIG. 10B;

FIG. 12 is a front perspective view of the adjustable seating assembly frame mounted to an underbody structure according to the embodiment of FIG. 11;

FIG. 13 is a front perspective exploded view of the adjustable seating assembly frame and underbody structure according to the embodiment of FIG. 11;

DETAILED DESCRIPTION OF THE PREFERRED EMBODIMENTS

Figure 1:
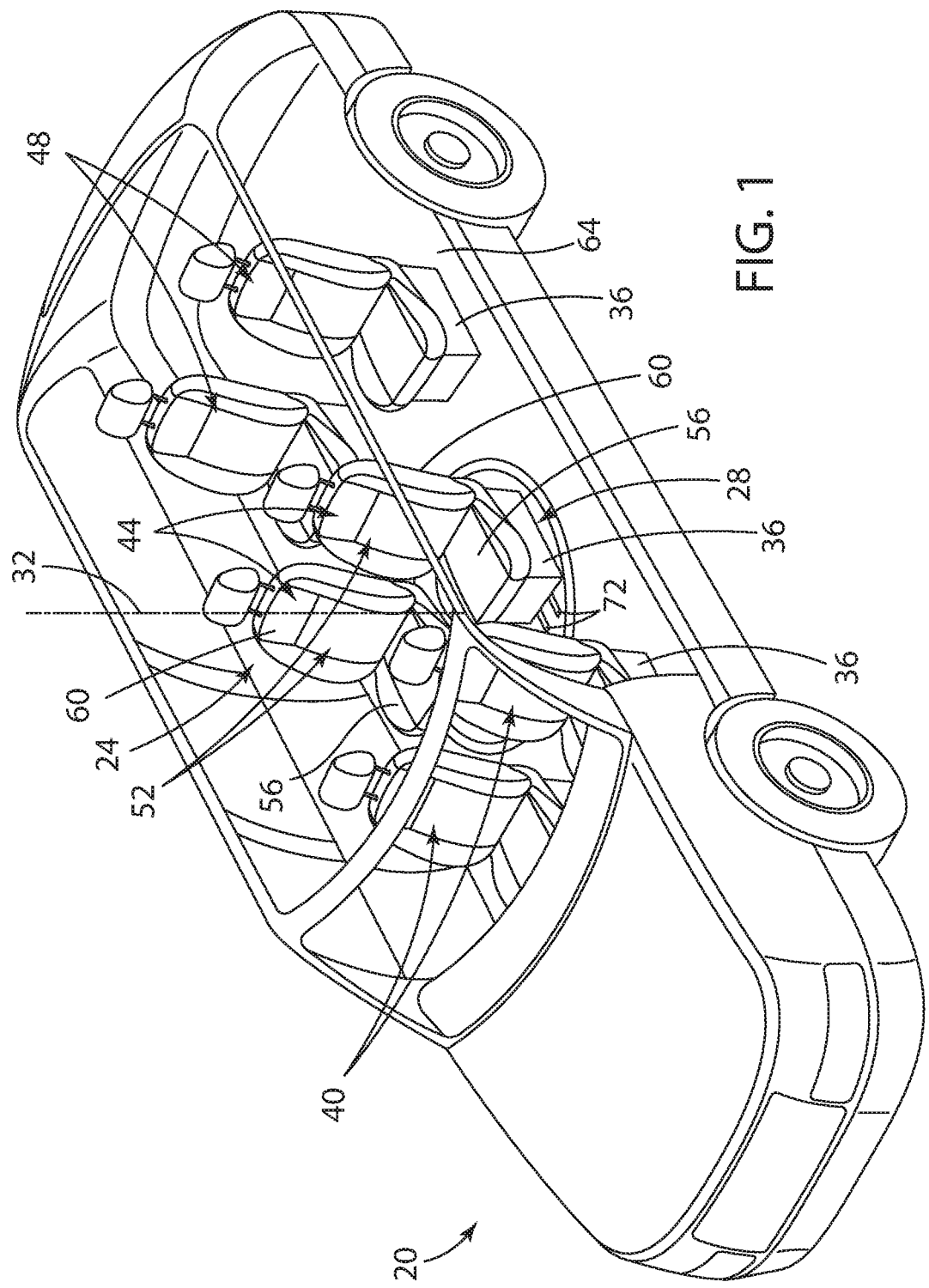
FIG. 1 is a top perspective view of a vehicle illustrating an adjustable seating assembly mounted to an underbody structure, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to an adjustable seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-10, reference numeral 20 generally designates a vehicle. The vehicle 20 may be a wheeled motor vehicle, a boat, a plane, a drive-controlled vehicle, and/or an autonomous vehicle. The vehicle 20 is equipped with an adjustable seating assembly 24. The adjustable seating assembly 24 includes a rotatable turntable 28 that is rotatable about a first vertical axis 32. The adjustable seating assembly 24 further includes a seat base 36 that is slidably coupled to the rotatable turntable 28. The seat base 36 can be slidably actuated regardless of a rotational position of the rotatable turntable 28.

Referring again to FIGS. 1 and 2, the vehicle 20 is shown with a first row 40, a second row 44, and a third row 48 of chair assemblies 52. The adjustable seating assembly 24 is positioned in the second row 44, according to one embodiment. The chair assemblies 52 further include a seat 56 and a seatback 60. At least one of the seat 56 and the seatback 60 may be operably coupled to the seat base 36. The rotatable turntable 28 is integrated into a floor 64 of the vehicle 20 in a substantially continuous or smooth manner such that occupants of the motor vehicle 20 are presented with a substantially continuous or smooth surface. In some embodiments, a riser 68 operably couples the seat base 36 to the rotatable turntable 28. The riser 68 may slidably engage with the rotatable turntable 28 such that the riser 68 is capable of slidable motion in a first direction relative to the rotatable turntable 28. The seat base 36 may be slidable in a second direction relative to the riser 68. In the depicted embodiment, the riser 68 may slide in a vehicle-forward direction and a vehicle-rearward direction by actuation of the riser 68 along a plurality of rotatable turntable seat tracks 72. The rotatable turntable seat tracks 72 may be integrally formed with the rotatable turntable 28 such that as the rotatable turntable 28 rotates about the first vertical axis 32, the rotatable turntable seat tracks 72 rotate with the rotatable turntable 28. The riser 68 may be equipped with riser tracks 76 that extend along the riser 68 in a direction that is non-parallel to the rotatable turntable seat tracks 72.

Figure 2:
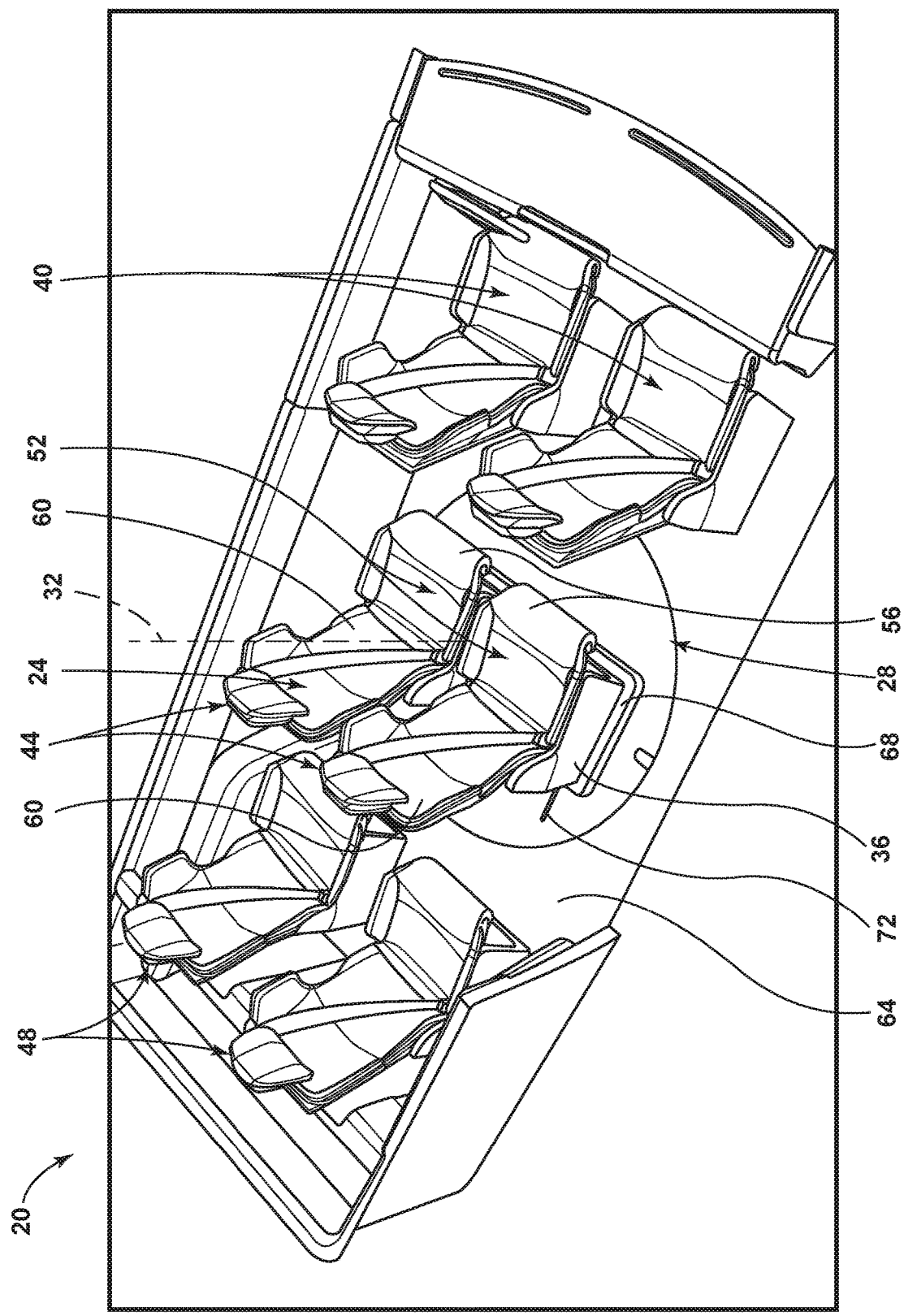
FIG. 2 is a top perspective view of a cabin of a vehicle illustrating an adjustable seating assembly in a forward-facing position and a shoulder-to-shoulder configuration mounted to an underbody structure, according to one embodiment.

Referring further to FIGS. 1 and 2, the seat bases 36 and their associated chair assemblies 52 that are operably coupled to the riser 68 may be actuated along the riser tracks 76 such that the chair assemblies 52 may be actuated between a shoulder-to-shoulder configuration (FIG. 1) and a spaced-apart configuration (FIG. 2). The seat base 36 may be slidable in the first direction and the second direction. The first direction of slidable engagement of the seat base 36 may be defined by the rotatable turntable seat tracks 72. The second direction of slidable actuation of the seat base 36 may follow, or generally be defined by, the riser tracks 76. The shoulder-to-shoulder configuration of the chair assemblies 52 may be beneficial for allowing easier ingress and egress of occupants to and from the third row 48. Additionally, the shoulder-to-shoulder configuration provides an increase in an uninterrupted surface area available for storage on the floor 64 on the vehicle 20. It is contemplated that while the first direction and the second direction are shown as non-parallel to each other, some embodiments may provide the first direction and the second direction as parallel to one another such that the chair assemblies 52 and/or the riser 68 may be actuated to a greater extent in a particular direction than in embodiments where the first direction and the second direction are non-parallel to one another.

Figure 3:
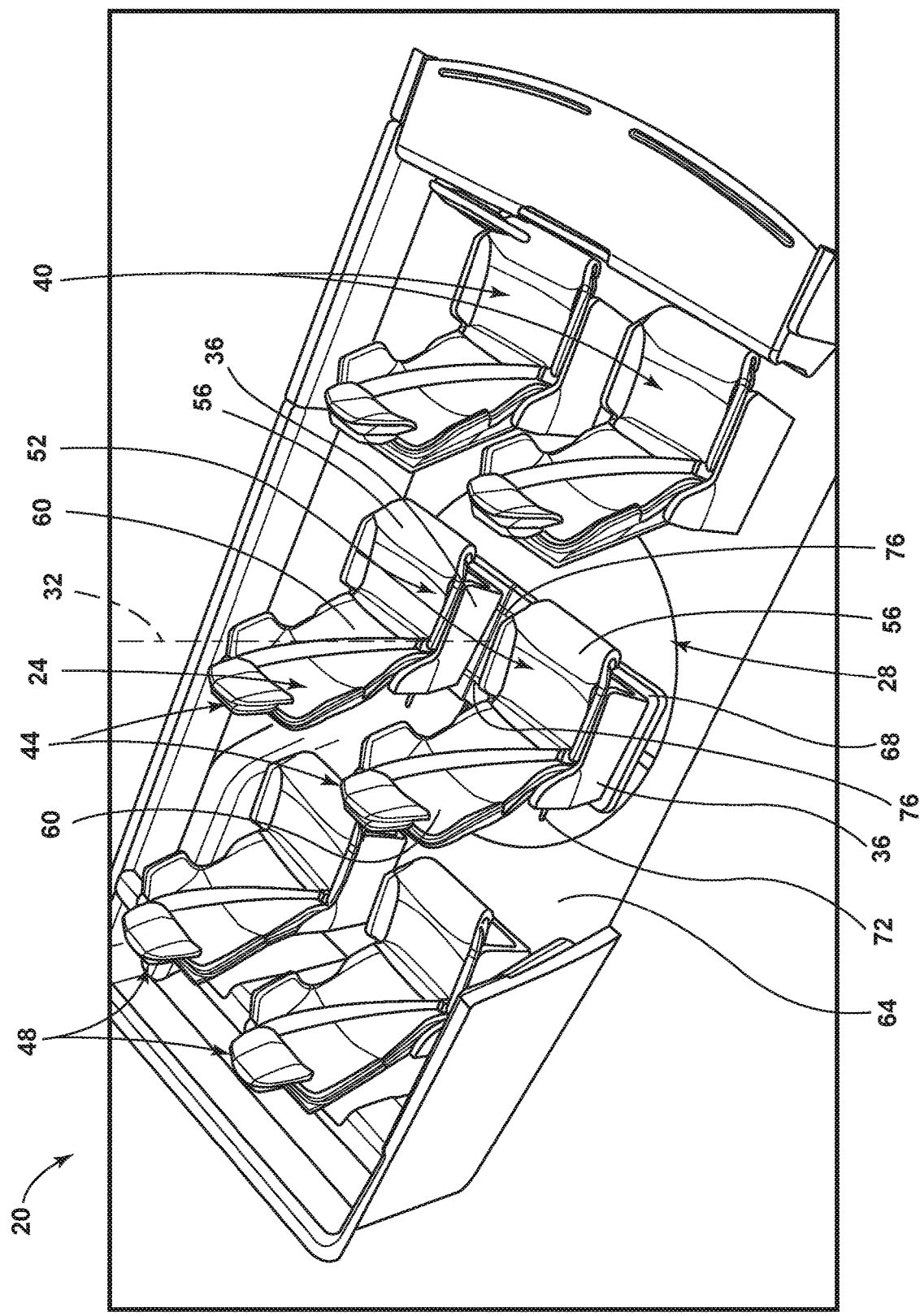
FIG. 3 is a top perspective view of the cabin of the vehicle illustrating the adjustable seating assembly in the forward-facing position and a spaced-apart configuration mounted to an underbody structure, according to one embodiment.
Figure 4:
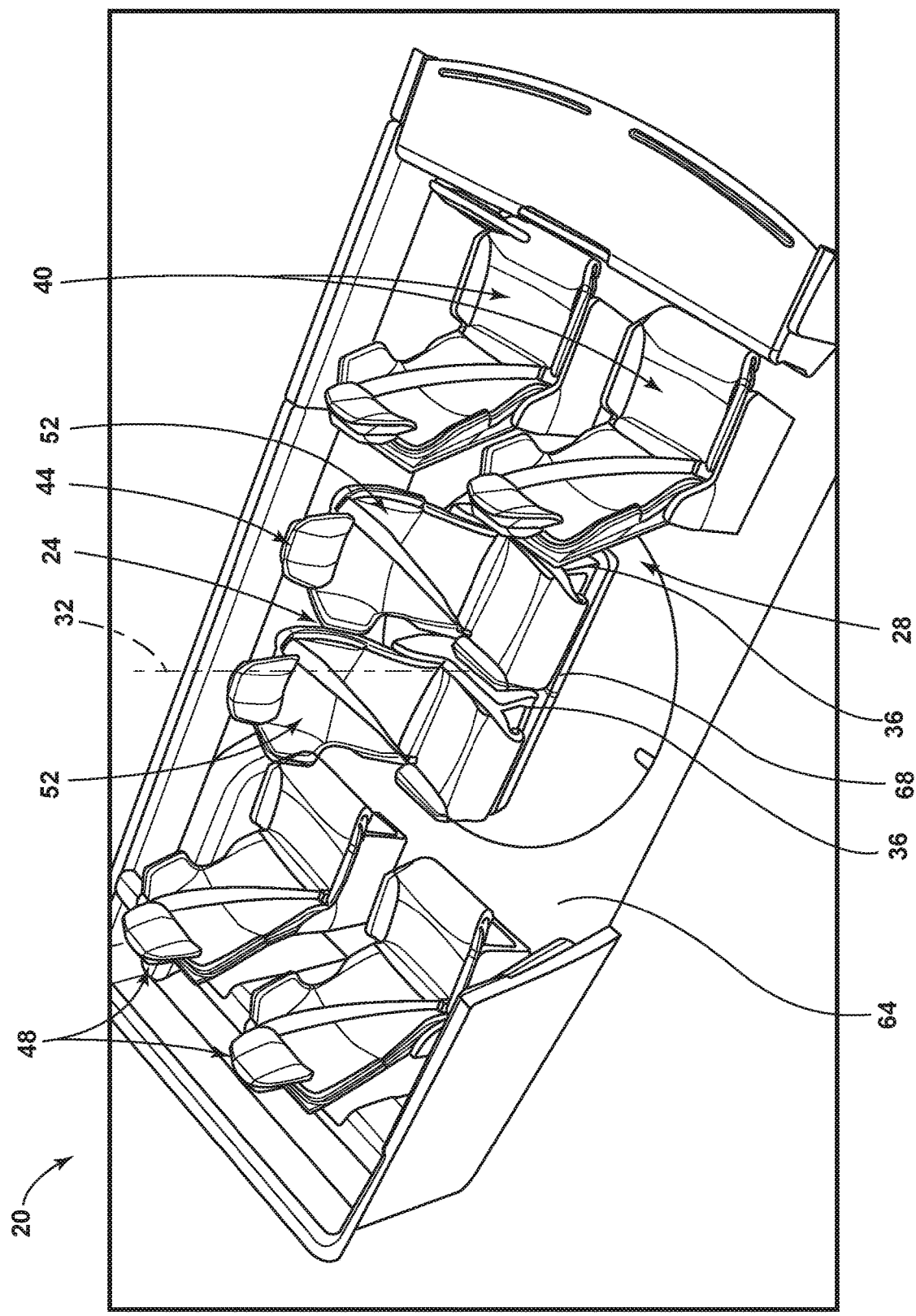
FIG. 4 is a top perspective view of the cabin of the vehicle illustrating the adjustable seating assembly in a side-facing position and the shoulder-to-shoulder configuration mounted to an underbody structure, according to one embodiment.

Referring now to FIGS. 3 and 4, the adjustable seating assembly 24 is shown rotated ninety degrees (90°) from the forward-facing position depicted in FIGS. 1 and 2 to assume the side-facing position depicted here. The shoulder-to-shoulder configuration of the chair assemblies 52 may be preferable when the adjustable seating assembly 24 is rotating about the first vertical axis so as to provide additional clearance between the rotating chair assemblies 52, the first row 40 and/or the second row 44. When the adjustable seating assembly 24 is in the side-facing position, the riser 68 maintains the ability to be actuated along the rotatable turntable seat tracks 72 between a forward-actuated position (FIG. 3) and a rotatable turntable rearward-actuated position (FIG. 4). The rotatable turntable rearward-actuated position of the riser 68 may be preferable when the adjustable seating assembly 24 is in the side-facing position. When the adjustable seating assembly 24 is in the side-facing position and the riser 68 is in the rotatable turntable rearward-actuated position, there is an increase in the uninterrupted surface area of the floor 64 such that items may be stored within the vehicle 20. Additionally, occupants of the second row 44 and the third row 48 may have an easier time conversing with one another when the adjustable seating assembly 24 is in the side-facing position and the riser 68 is in the rotatable turntable rearward-actuated position.

Figure 5:
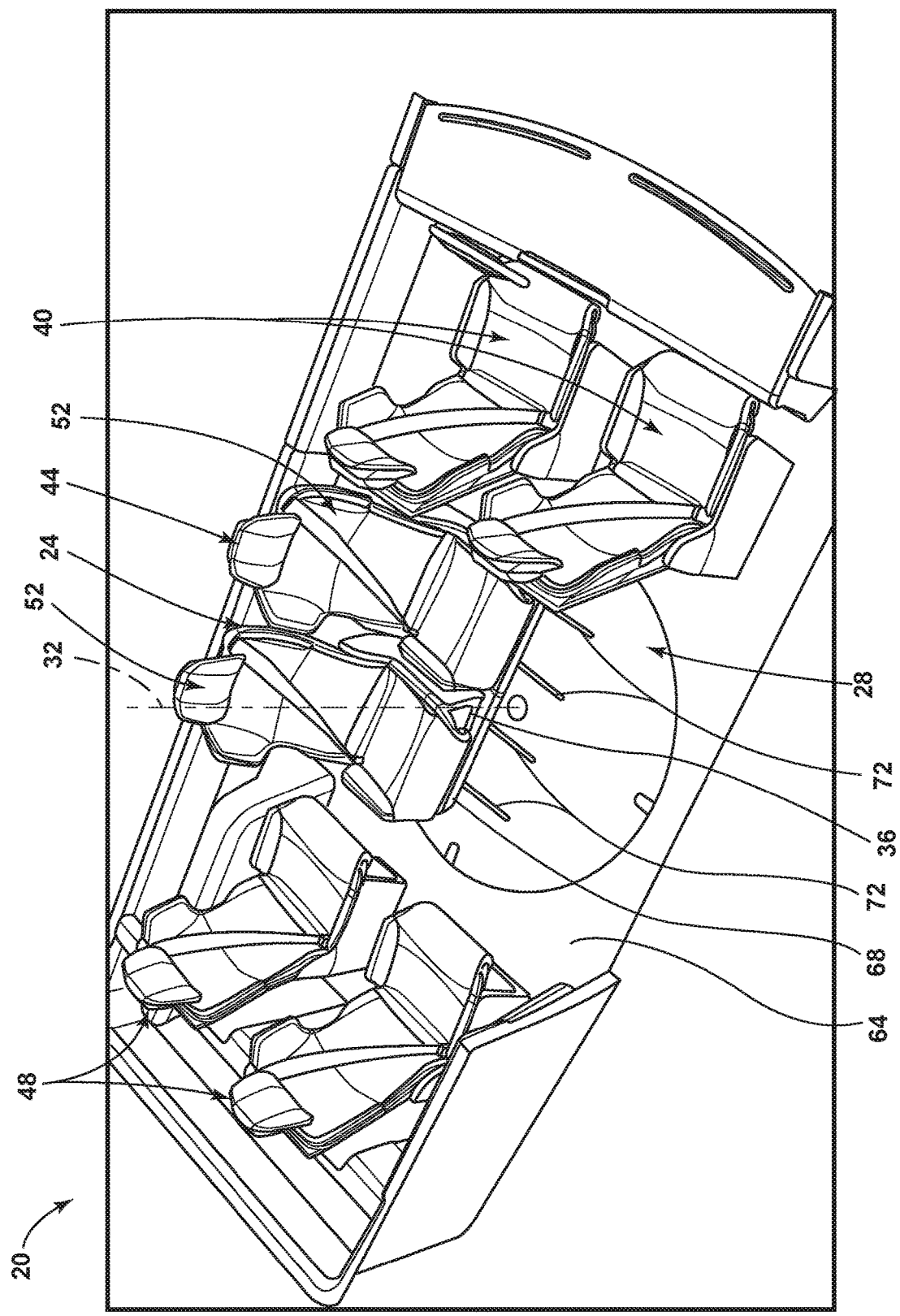
FIG. 5 is a top perspective view of the cabin of the vehicle illustrating the adjustable seating assembly in the side-facing position and in a rotatable turntable rearward-actuated position mounted to an underbody structure, according to one embodiment.

Referring to FIG. 5, the adjustable seating assembly 24 is shown in the side-facing position with the riser 68 in the rotatable turntable rearward-actuated position. Additionally, the seat bases 36 and their associated chair assemblies 52 are pivoted slightly toward one another about a second vertical axis 78 that is positioned approximately through a center of each of the seats 56 of the chair assemblies 52. The seat bases 36 and their associated chair assemblies 52 may be pivoted about the second vertical axis 78 regardless of the rotational position of the rotatable turntable 28. In some embodiments, the seat bases 36 may be directly and pivotably coupled to the rotatable turntable 28. In alternative embodiments, the seat bases 36 may be directly and pivotably coupled to the riser 68. The seat bases 36 and their associated chair assemblies 52 may pivot through a full three hundred sixty degree (360°) rotation relative to the riser 68. That is, in addition to the rotational motion possible with the rotatable turntable 28, the seat bases 36 and their associated chair assemblies 52 may pivot independently from the rotatable turntable 28. In various embodiments, the pivotable motion of the seat bases 36 and their associated chair assemblies 52 may pivot relative to the riser 68 and/or the rotatable turntable 28 in a range of at least about one degree (1°) to less than about fifteen degrees (15°), at least about fifteen degrees (15°) to less than about thirty degrees (30°), at least about thirty degrees (30°) to less than about sixty (60°) degrees, at least about sixty degrees (60°) to less than about ninety degrees (90°), at least about ninety degrees (90°) to less than about one hundred twenty degrees (120°), at least about one hundred twenty degrees (120°) to less than about one hundred eighty degrees (180°), at least about one hundred eighty degrees (180°) to less than about three hundred sixty degrees (360°), and/or combinations or ranges thereof including intermediate values.

Referring again to FIG. 5, the pivotable motion of the seat bases 36 and their associated chair assemblies 52 may be configured to mirror one another. Said another way, in embodiments that provide the pivotable motion as less than about three hundred sixty degrees (360°), the pivotable motion of the seat bases 36 and their associated chair assemblies 52 may be configured to be mirror images of one another such that occupants may turn to at least partially face one another while occupying the chair assemblies 52 on the rotatable turntable 28. The seat bases 36 have also been actuated along the riser tracks 76 to assume the spaced-apart position. It may be beneficial to have the seat bases 36 actuated along the riser tracks 76 when the chair assemblies 52 are in the pivoted position depicted here. The spaced-apart position of the chair assemblies 52 may allow for additional spacing between the legs of occupants that are seated in the chair assemblies 52. With the chair assemblies 52 in the pivoted position shown, occupants of the chair assemblies 52 may converse with one another and not have to turn their heads or upper bodies to as great of an extent as when the chair assemblies 52 are not in the pivoted position.

Figure 6:
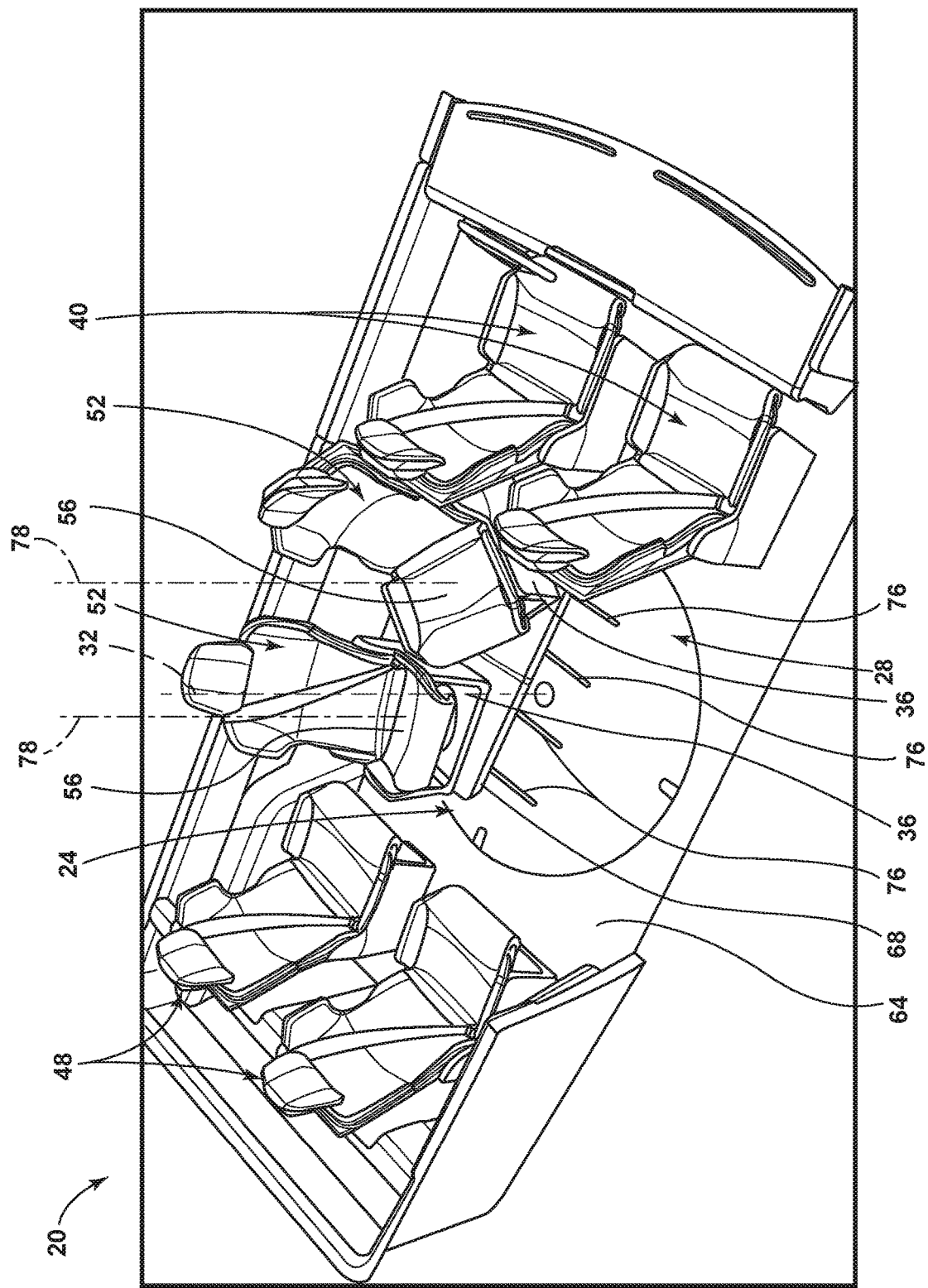
FIG. 6 is a top perspective view of the cabin of the vehicle illustrating chair assemblies of the adjustable seating assembly in a pivoted position toward one another mounted to an underbody structure, according to one embodiment.
Figure 7:
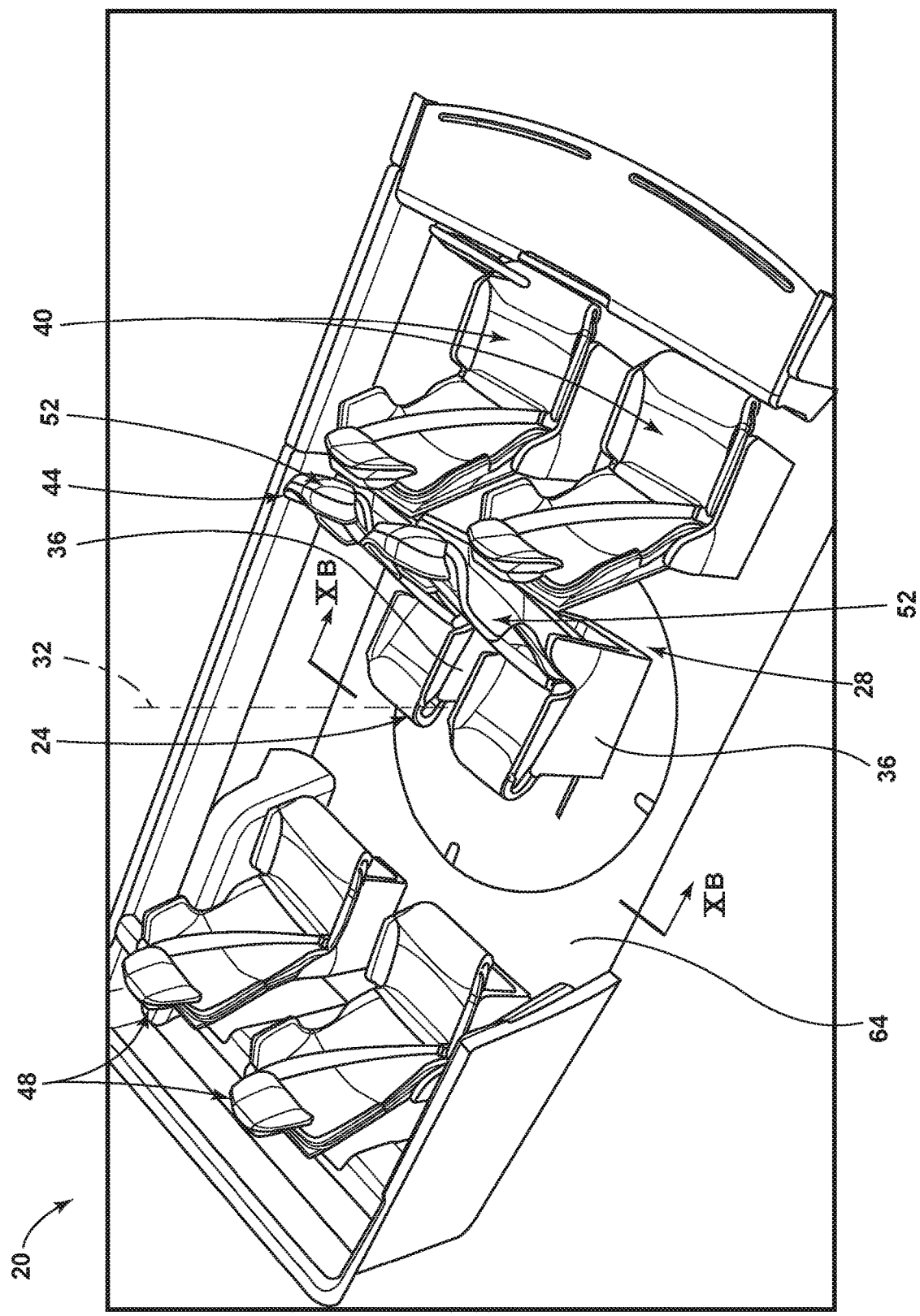
FIG. 7 is a top perspective view of the cabin of the vehicle illustrating the adjustable seating assembly in a rear-facing position and the rotatable turntable rearward-actuated position mounted to an underbody structure, according to one embodiment.

Referring now to FIG. 6, the adjustable seating assembly 24 is shown in a rear-facing position. Additionally, the riser 68 is in the rotatable turntable rearward-actuated position such that the seatbacks 60 of the first row 40 and the second row 44 are in close proximity to one another. By so positioning the adjustable seating assembly 24, additional surface area is available on the floor 64 of the vehicle 20 to accommodate cargo items or to allow occupants of the chair assemblies 52 that are facing one another to sit comfortably while remaining free of physical contact with one another. The rear-facing position of the adjustable seating assembly 24 may be particularly desirable for occupants who wish to converse with one another. The rear-facing position of the adjustable seating assembly 24 may provide a substantially lower difficulty for ingress and egress of occupants to the second row 44 and the third row 48 than other positions. The rear-facing position of the adjustable seating assembly 24 may be a preferable configuration of the vehicle 20 when the vehicle 20 is being operated as a ride-sharing or taxi service.

Referring to FIGS. 7A and 7B, a drive mechanism 80 for rotatable actuation of the rotatable turntable 28 is shown, according to one embodiment. The depicted embodiment of the drive mechanism 80 is a cable-driven mechanism. The drive mechanism 80 may include a cable 84, one or more pulleys 88, and/or one or more motors 92. The drive mechanism 80 is housed within the rotatable turntable 28 such that occupants of the vehicle 20 (FIG. 1) are not presented with safety hazards from the movable parts of the drive mechanism 80. In some embodiments, the motor 92 may be integrally formed with the pulleys 88 such that the pulley 88 and the motor 92 are a combination that is capable of spooling the cable 84 around the pulleys 88.

Referring now to FIG. 8, the drive mechanism 80 may be a belt-driven mechanism. The drive mechanism 80 may be housed below a surface of the floor 64 of the vehicle 20 (FIG. 1). The drive mechanism 80 may be positioned below the rotatable turntable 28 or radially outward from the rotatable turntable 28. The drive mechanism 80 of the depicted embodiment includes a belt 96, a drive wheel 100, and/or the motor 92. The belt 96 may extend around a circumference of the rotatable turntable 28 and engage with an exterior surface of the drive wheel 100. The motor 92 may be capable of clockwise and/or counterclockwise motion such that the rotatable turntable 28 may be rotated in clockwise and/or counterclockwise directions. The drive mechanism 80 may include a braking system that may be engaged as the rotatable turntable 28 approaches a desired position. The braking system may be controlled by a controller that is equipped with preset positions of the rotatable turntable 28 such that the controller is able to sense when the rotatable turntable 28 is approaching one of the present positions, for example, by utilizing a rotational displacement sensor. Alternatively, the rotatable turntable 28 may be button-activated such that the braking system engages when an occupant releases the button responsible for rotational actuation of the rotatable turntable 28. In another alternative, the rotatable turntable 28 may be manually actuated such that the braking mechanism may be omitted.

Figure 9:
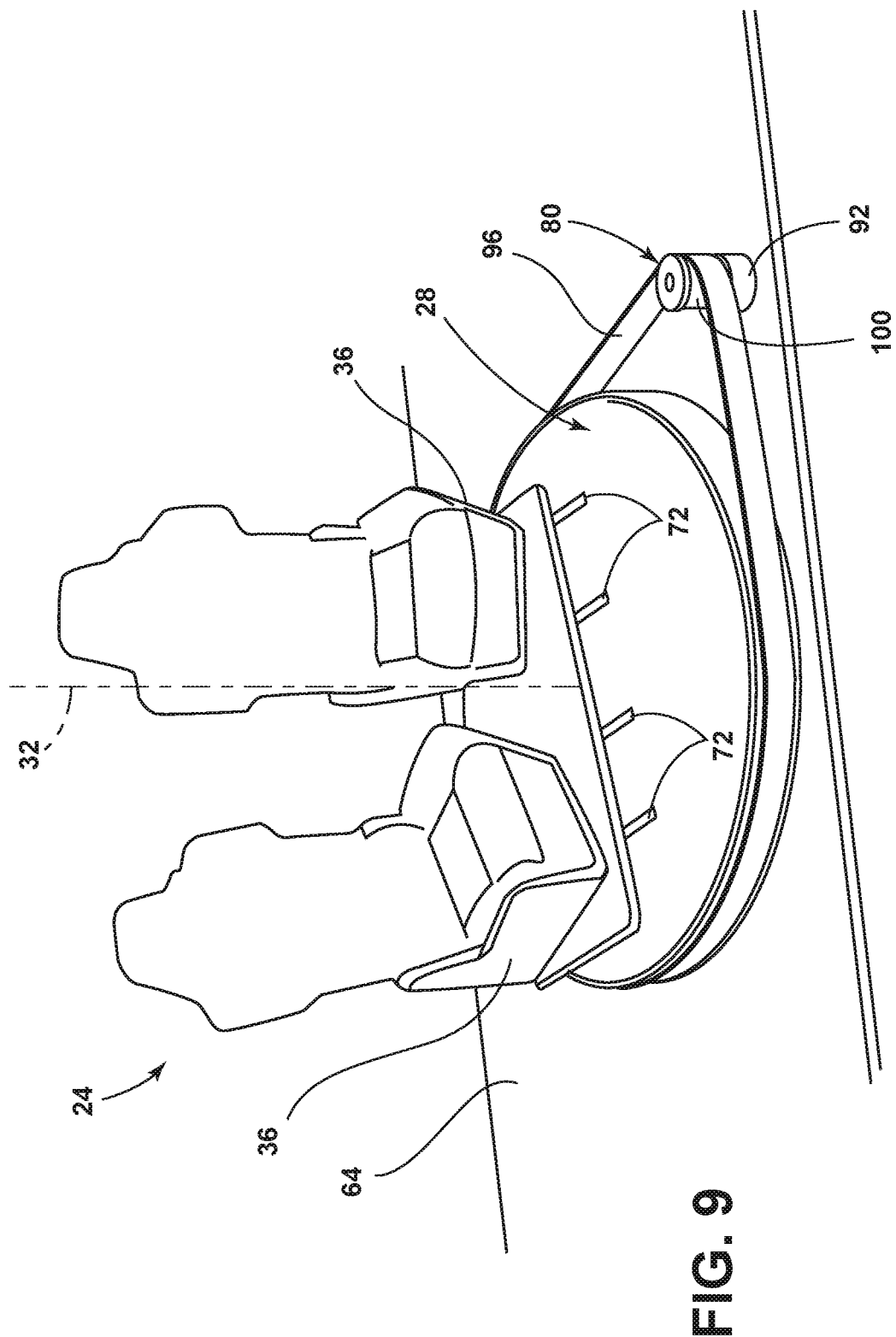
FIG. 9 is a front perspective view of the adjustable seating assembly illustrating the drive mechanism, according to another embodiment.
Figure 11:
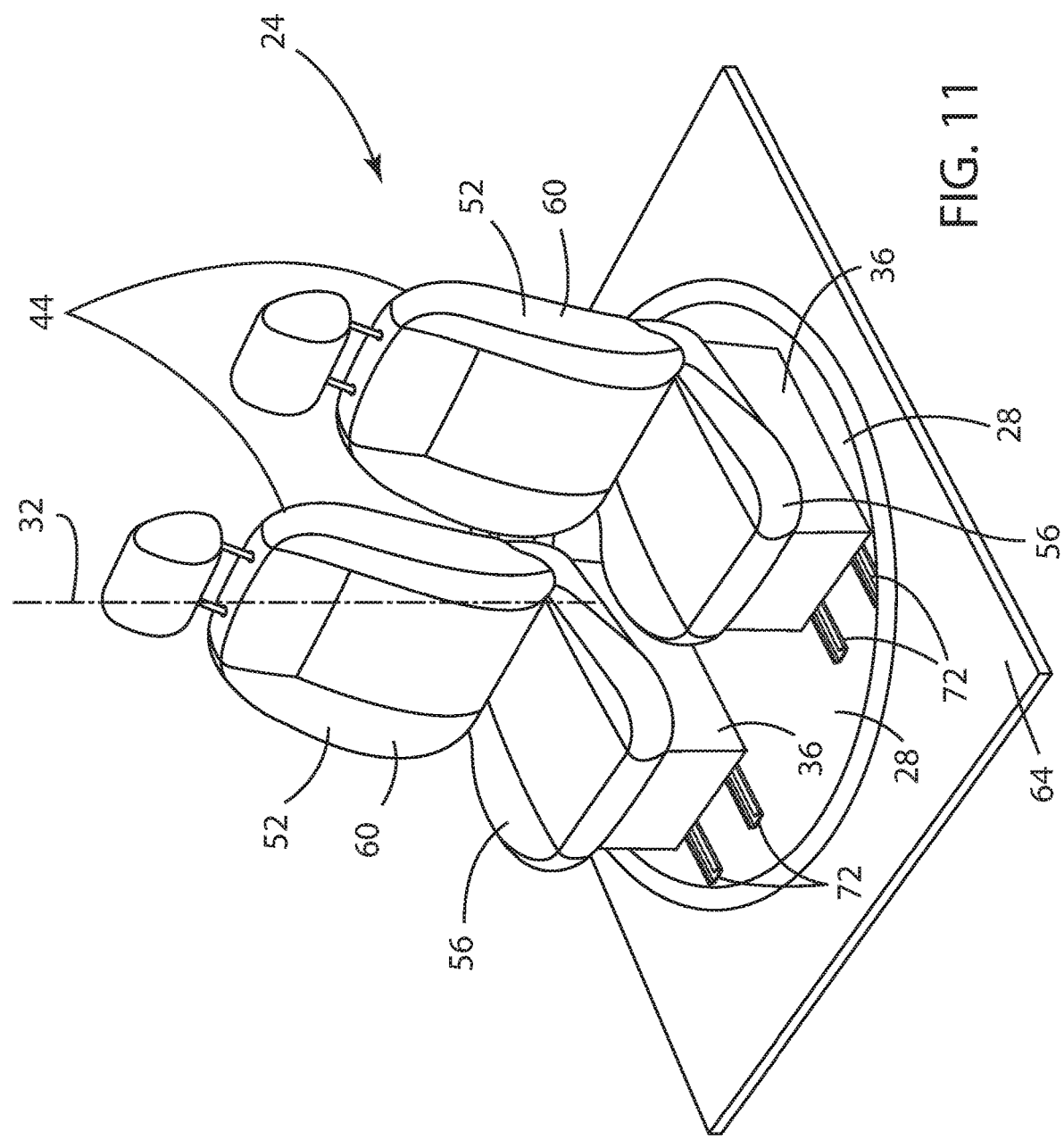
FIG. 11 is a front perspective view of the adjustable seating assembly mounted to an underbody structure according to another embodiment.

Referring to FIG. 9, the drive mechanism 80 may be a wheel-driven mechanism. In the depicted embodiment the rotatable turntable 28 is equipped with a lip 104 that may extend downward from a top surface of the rotatable turntable 28 and/or depend from a perimeter of the rotatable turntable 28. The lip 104 may be configured to engage with a wheel 108 of the drive mechanism 80. The motor 92 of the drive mechanism 80 may be operably coupled to the wheel 108 by a driveshaft 112. The drive mechanism 80 may be capable of clockwise and counterclockwise rotation such that clockwise and counterclockwise actuation of the rotatable turntable 28 is possible. In some embodiments, the drive mechanism 80 may be rotatable in clockwise or counterclockwise direction such that the rotatable turntable 28 may be rotated in a clockwise or counterclockwise direction while not being permitted to rotate in the other of the clockwise or counterclockwise direction. The motor 92 may be an electric motor that is electrically coupled to a power supply, such as the battery of the vehicle 20 (FIG. 1), by electrical pigtails 116. The lip 104 may be positioned generally vertically above the driveshaft 112.

Referring now to FIGS. 10A and 10B, the rotatable turntable 28 may be equipped with a trough 120. The trough 120 may be generally U-shaped and may define one or more apertures 124 in an outer wall 128 of the trough 120. The floor 64 of the vehicle 20 (FIG. 1) may include an access ring 132 that is positioned above the trough 120 and generally radially outward from a top surface of the rotatable turntable 28. The access ring 132 may be operably coupled to the floor 64 of the vehicle 20 by one or more fasteners 136. The access ring 132 and the floor 64 may engage at a step 140 in the floor 64. The step 140 in the floor 64 is generally configured to correspond with the access ring 132 such that a generally smooth surface is maintained as the floor 64 transitions to the access ring 132. Said another way, the step 140 may be recessed from a top surface of the floor 64 an amount that corresponds to a thickness of the access ring 132. The fasteners 136 may couple the access ring 132 to the step 140 in the floor 64. The access ring 132 may be equipped with a protrusion 144 that extends from an underside of the access ring 132. The protrusion 144 may be spaced away from the step 140 such that the outer wall 128 of the trough 120 may travel between the protrusion 144 and the step 140. Alternatively, the outer wall 128 may be positioned generally below the protrusion 144 such that the protrusion 144 may be supported by the outer wall 128 of the trough 120.

Referring again to FIGS. 10A and 10B, the motor 92 may be positioned below the floor 64. The driveshaft 112 may extend from the motor 92 such that the wheel 108 is positioned below a bottom wall 148 of the trough 120. The wheel 108 may engage with an underside of the bottom wall 148 such that rotational motion imparted to the wheel 108 by the motor 92 is translated to the rotatable turntable 28. The drive mechanism 80 may additionally include one or more stop pins 152 that are configured to engage with the one or more apertures 124 in the trough 120. The stop pin 152 may include a core 156 that is made from a substantially rigid material (e.g., steel) and a casing 160 that is made from a material that is softer than the core 156 (e.g., nylon). The stop pin 152 may include a planar portion 164 and a tapered portion 168. The tapered portion 168 may be configured to engage with the apertures 124 in the trough 120. In general, the one or more stop pins 152 may be utilized as the braking system for the drive mechanism 80 or rotatable turntable 28. Additionally, the one or more stop pins 152 may be utilized for increased safety while the vehicle 20 is in motion, for example, during vehicle maneuvers or impact events. A floor covering 172 may be coupled to a top surface of the rotatable turntable 28, the floor 64, and/or the access ring 132. The fasteners 136 of the access ring 132 may remain accessible below the floor covering 172 such that maintenance and/or service to the rotatable turntable 28 and drive mechanism 80 may be made easier. While the access ring 132 is shown and described as being coupled to the floor 64, it is contemplated that the access ring 132 may be operably coupled to the rotatable turntable 28 or another part of the vehicle 20 without departing from the concepts disclosed herein.

The adjustable seating assembly 24 of the present disclosure provides additional adjustability and flexibility to the configuration of a cabin of the vehicle 20. The adjustable seating assembly 24 may be provided as a modular assembly that is configured for rapid assembly into the vehicle 20 in a predictable manner and with greater ease than alternative approaches that may utilize seating assemblies that are supported on individual rotatable turntable-like solutions. The adjustable seating assembly 24 of the present disclosure eliminates multiple in-floor track systems and motion transfer points that complicate the management of the motion of the adjustable seating assembly in alternative approaches that may utilize individual rotatable turntable-like solutions for each chair assembly 52.

A further aspect of the present disclosure can be seen in FIGS. 11-19, wherein additional embodiments of an underbody structure 200 for supporting the adjustable seating assembly 24 for a motor vehicle 20 is shown. These additional embodiments disclose a new lightweight underbody load path architecture capable of transferring impact loads, managing impact energy, and protecting occupants in various seating configurations at minimal cost and weight. In one embodiment of the underbody structure 200, the rotatable turntable 28 is operably coupled to an underbody 202 of the motor vehicle 20.

As perhaps best shown in FIGS. 12-15 and 18, the rotatable turntable 28 includes a rotatable circular platform 204 disposed above a recess 206 within which a brace 210 is received. The brace 210 is operably coupled with the rotatable turntable 28 and the underbody 202 of the motor vehicle 20 and extends substantially across the rotatable turntable 28. So situated, the brace 210 is adapted to transfer loads through the underbody structure 200 to assist in maintaining the structural integrity of the underbody 202 of the motor vehicle, as further described below.

The rotatable circular platform 204 may include a pair of parallel slots 212 extending therethrough and through which the pair of rotatable turntable seat tracks 72 of the individual chair assemblies 52 of the adjustable seating assembly 24 extend. The rotatable turntable seat tracks 72 may include a lower rail 214 having a lengthwise slot 216 within each of which is received a pair of slidable shoes 218 operably coupled with one of a pair of seat risers 220 of the chair assemblies 52. The seat risers 220 pass through the pair of parallel slots 212. The individual chair assemblies 52 of the adjustable seating assembly 24 thus configured may slidably actuate between the first extended position, as shown in FIG. 4, and the second rearward-actuated position, as shown in FIG. 5, regardless of a rotational position of the rotatable turntable 28.

Figure 19:
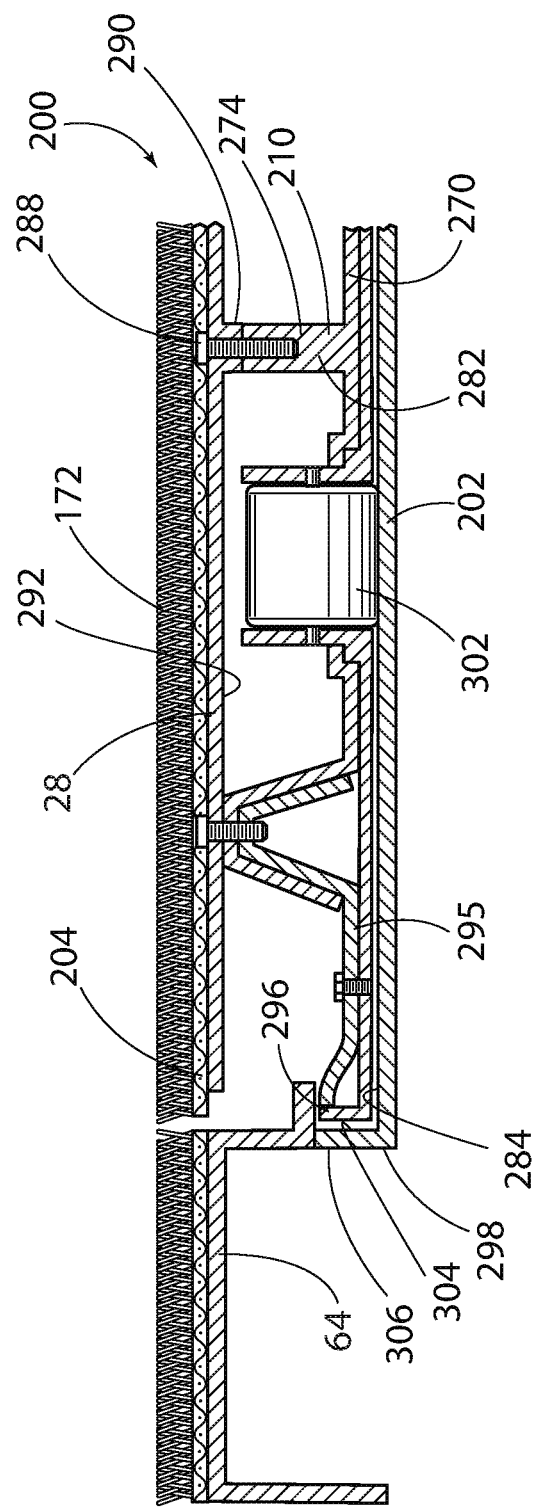
FIG. 19 is a cross-sectional side view of the underbody structure according to the embodiment of FIG. 18, taken along the line XIX-XIX of FIG. 18.

The recess 206 preferably includes an annular side wall 222 defining an interior surface 224 operably coupled with the brace 210 and an exterior surface 226 operably coupled with a side structure 228 of the motor vehicle 20, as perhaps best seen in FIGS. 12, 13, and 19. Preferably, the side structure 228 of the motor vehicle 20 is a rocker panel 262 (or a runner). The adjustable seating assembly 24 is preferably operably coupled to the brace 210 and the underbody 202 of the motor vehicle 20 and may be rotated along with the rotatable circular platform 204 of the rotatable turntable 28 to the aforementioned rotational positions to maximize occupant comfort and convenience by means of any of the embodiments described above.

Figures 14, 15:
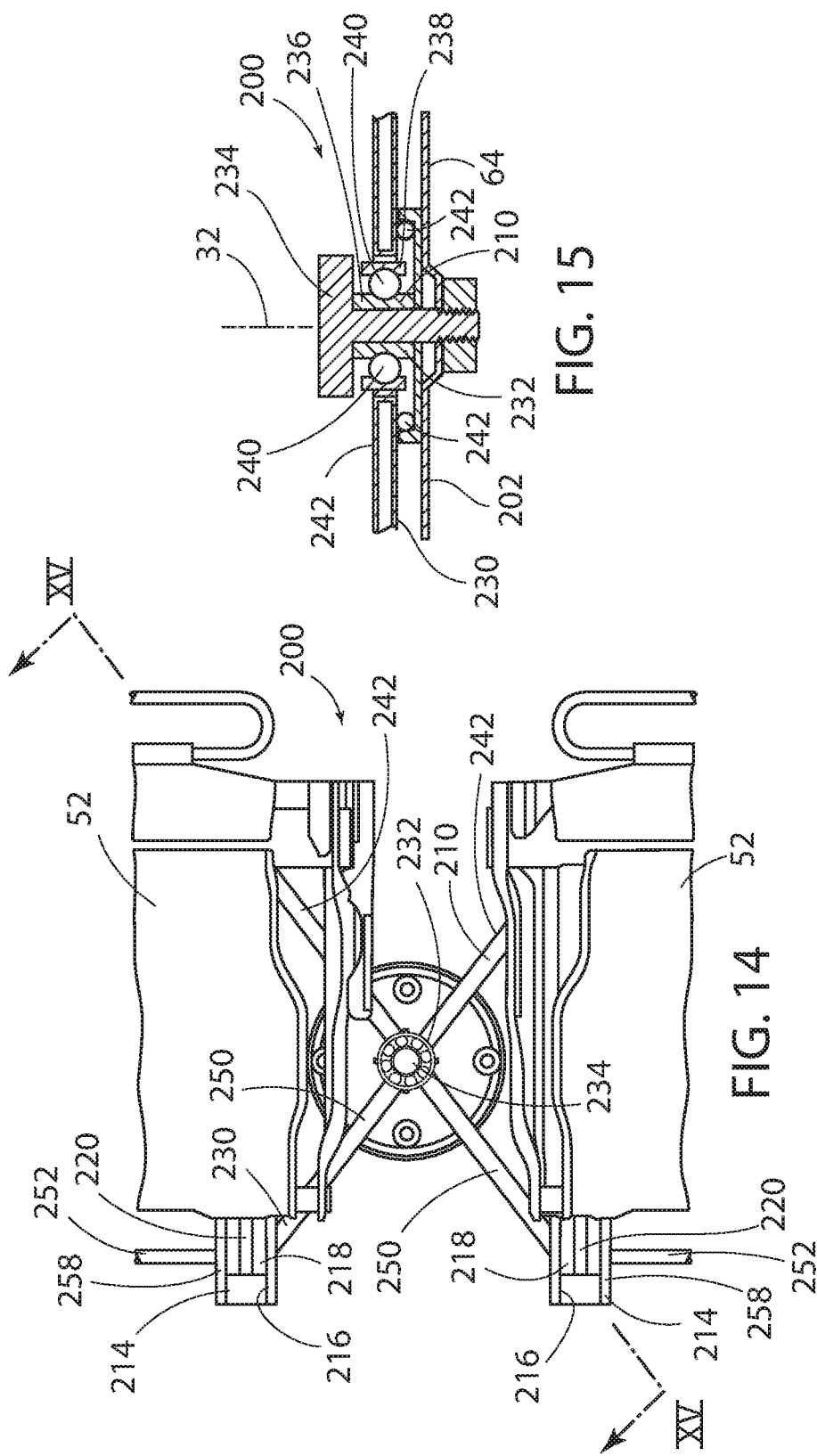
FIG. 14 is a top view of the central hub of the brace of the underbody structure according to the embodiment of FIG. 11.
FIG. 15 is a side cross-sectional view of the central hub of the brace of the underbody structure according to the embodiment of FIG. 11, taken along line XV-XV of FIG. 14.
Figure 16:
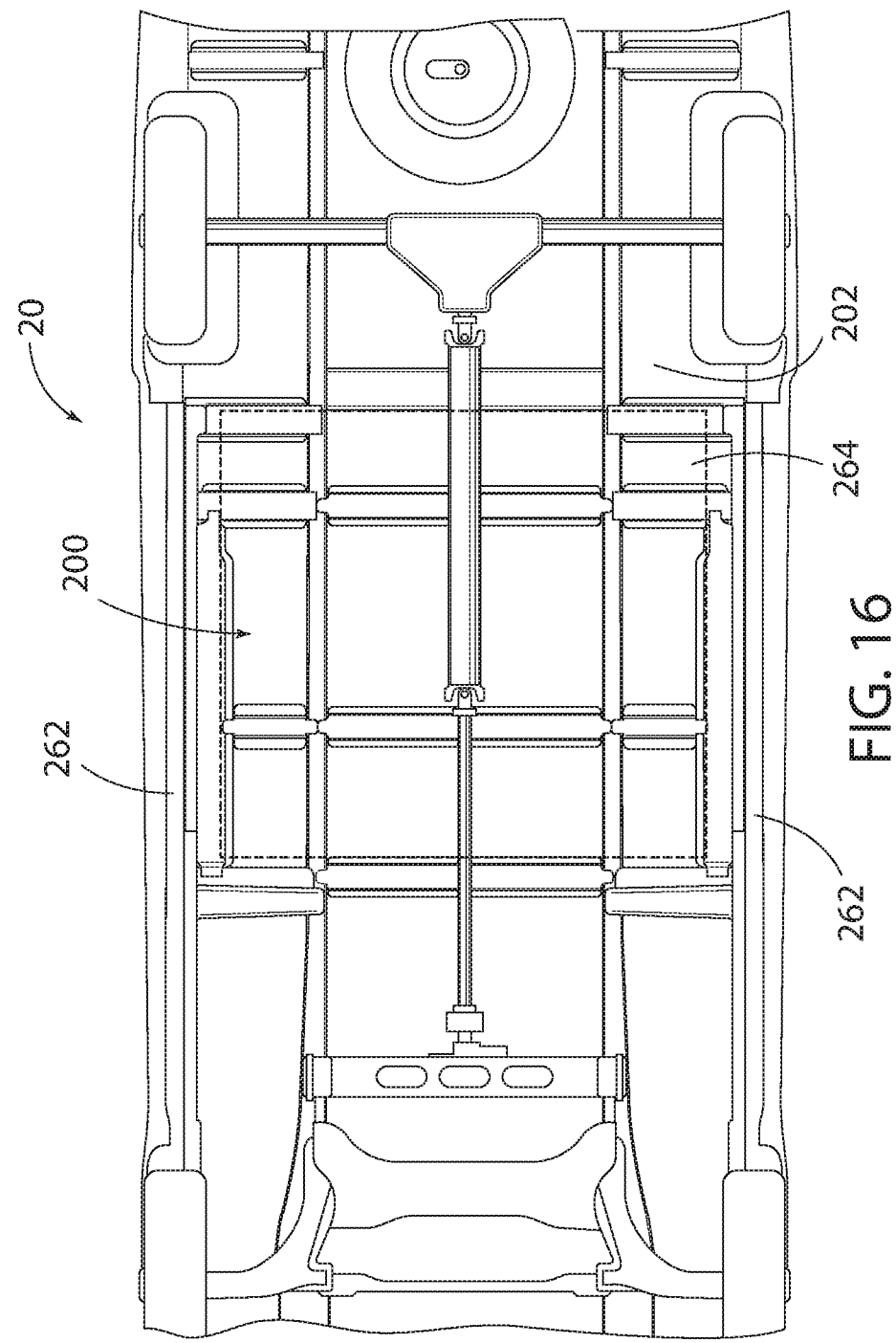
FIG. 16 is a bottom view of the underbody of the motor vehicle according to the embodiment of FIG. 11.

In one embodiment of the underbody structure 200, the brace 210 comprises a truss-like structure 230, perhaps best shown in FIGS. 12-15. Preferably, the truss-like structure 230 is constructed of high strength extruded aluminum tubes welded to a central hub 232 through which a central bolt 234 extends to operably couple the brace 210 to the underbody 202 of the motor vehicle 20 and to which the truss-like structure 230 is attached, as shown in FIG. 15. The central hub 232 of the brace 210 may include a fixed inner race 236 and a rotatable outer race 238 between which are disposed a plurality of ball bearings 240 in regular intervals. The inner proximal portion 242 of the truss-like structure 230 is preferably attached to the rotatable outer race 238 by welding. The brace 210 is thus operably coupled with the underbody 202 of the motor vehicle 20. As best seen in FIG. 15, the underbody structure 200 further includes guiding rollers 244 disposed beneath the truss-like structure and above the underbody 202 of the motor vehicle 20 by which the truss-like structure 230 and the rotatable circular platform 204 are supported.

Preferably, the truss-like structure 230 is constructed as a pair of opposed hexagonal sections 246, as best seen in FIG. 13. Each one of the pair of opposed hexagonal sections 246 is arranged and disposed on opposed sides of the central hub 232. So constructed, the truss-like structure 230 extends on either side from the central hub 232 and central bolt 234 at the first vertical axis 32 of the rotatable turntable 28 rotation at the inner proximal portion 242 of the truss-like structure to the interior surface 224 of the annular side wall 222 of the recess 206 at the outer distal portion 248 of the truss-like structure 230. The exterior surface 226 of the annular side wall 222, due to its proximity, is operably coupled with a side structure 228 of the motor vehicle 20. The size of the gap between the interior surface 224 of the annular side wall 222 with the outer distal portion 248 of the truss-like structure 230 is preferably about 0.25-0.5 inch. The truss-like structure 230 so situated effectively extends substantially across and beneath the diameter of the rotatable turntable 28, as may be seen in FIGS. 12 and 13.

More particularly, the truss-like structure 230 preferably includes a central portion 250, an intermediate portion 252, and an exterior portion 254. The central portion 250 extends from the central hub 232 rotatably coupled with the fixed central bolt 234 to a first 258 of the pair of seat tracks 72 and is preferably constructed from a first pair of tubular members 251 each radially extending from the central hub 232 to the first 258 of the pair of seat tracks 72. The intermediate portion 252 is operably coupled with the chair assembly 52 of the adjustable seating assembly 24 via the pair of seat tracks 72 and are spaced in parallel relation with each other. The intermediate portion 252 likewise is preferably constructed from a pair of tubular members 253 in spaced parallel relation with each other and in orthogonal relation to the pair of seat tracks 72. The exterior portion 254 extends from a second 260 of the pair of seat tracks 72 to the interior surface 224 of the annular side wall 222 and thus proximate the side structure 228 of the motor vehicle 20. The exterior portion 254 also is preferably constructed from a pair of tubular members 255, each extending from a common apex 256 of the truss-like structure 230 proximate the side structure 228 of the motor vehicle 20 to the second 260 of the pair of seat tracks 72.

Figure 17:
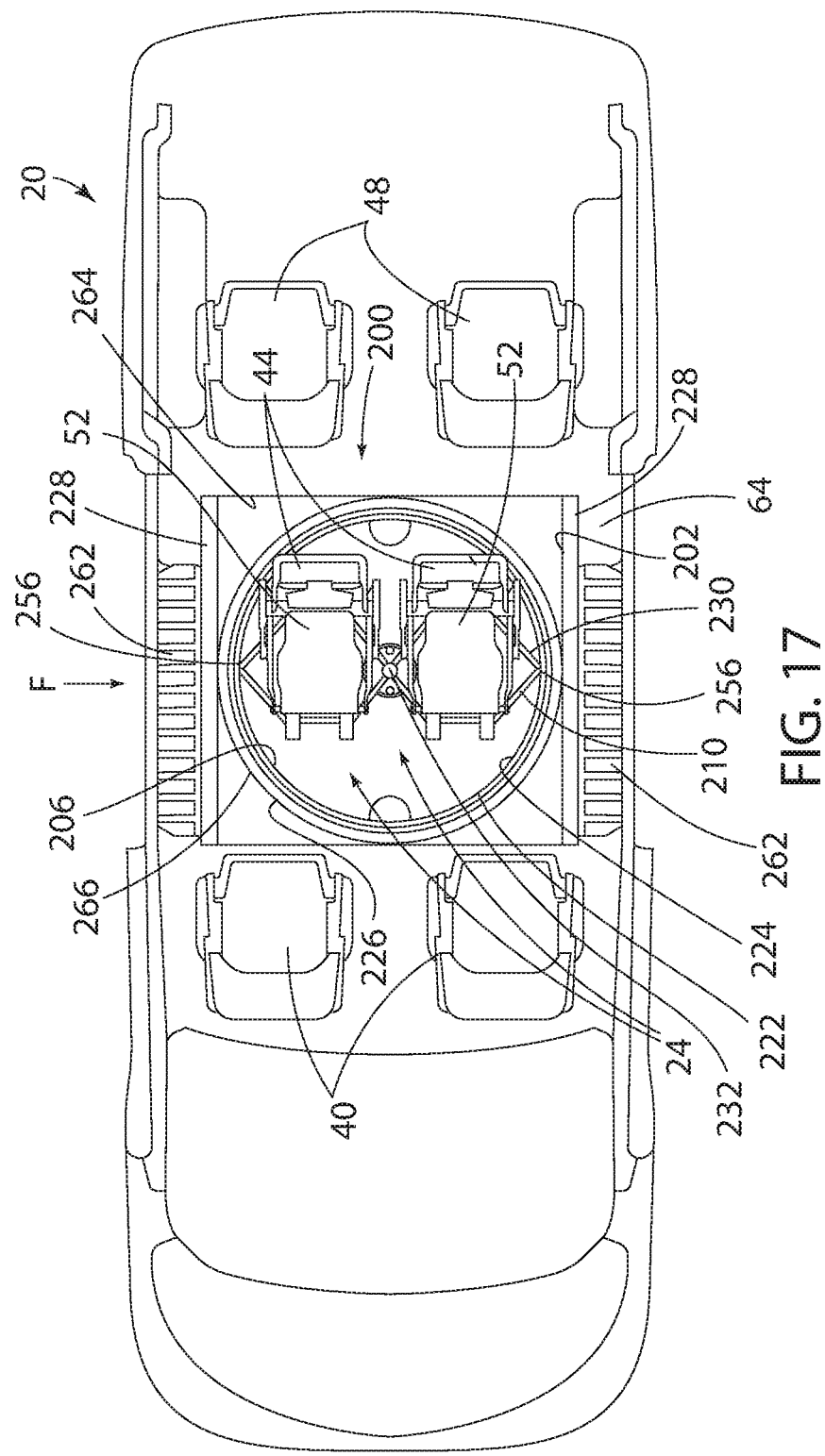
FIG. 17 is a top view of the cabin of the motor vehicle according to the embodiment of FIG. 11.

Preferably, the brace 210 comprises the pair of truss-like structures 230, each of which is operably coupled with the adjustable seating assembly 24, each of which is disposed on opposed sides of the central hub 232, and each of which is aligned across the rotatable turntable 28, as shown in FIGS. 12 and 13. The pair of seat tracks 72 of the chair assembly 52 of the adjustable seating assembly 24 further preferably are thus operably coupled with and extend orthogonally between opposed segments of the intermediate portion 252 of the truss-like structure 230. The pair of seat tracks 72 are preferably fixed to the truss-like structure 230 and effectively act to reinforce the same under a side load F applied to the motor vehicle 20, as shown in FIG. 17.

Thus, in the event that a side load F is imposed upon the motor vehicle 20, such as may occur during a side-impact event, the load is applied against the rocker panel 262 (or some other similar structure, such as a strong sled runner) arranged parallel to the longitudinal length of the motor vehicle and proximate an outer portion thereof. The load is then transferred to the underbody 202, which is preferably provided with cavity 264 within which the recess 206 is situated within the underbody 202 of the motor vehicle 20. As shown in FIGS. 12, 13, and 14, the cavity 264 may have a substantially square shape. However, due to its circular configuration, the recess 206 transfers the load around its outer circumference 266. While normally such a force would tend to deform the recess 206 inward, the presence of the brace 210, which is operably coupled with the interior surface 224 of the annular side wall 222 of the recess 206 at opposed outer distal portions 248 of the truss-like structure 230, acts to reinforce the outer circumference 266 of the recess 206 and transfer the load through the truss-like structure 230 to assist in maintaining the structural integrity of the underbody 202 of the motor vehicle 20, particularly when the rotatable turntable 28 is rotated to the forward facing or rearward facing positions shown in FIGS. 1, 2, 3, and 7.

In another embodiment shown in FIGS. 18 and 19, the brace 210 may include a circular disk 270 disposed below the rotatable circular platform 204 and above a circular pan 272 within which the circular disk 270 is received. The circular disk 270 also may be fabricated from a lightweight metal, such as high strength aluminum, and preferably includes an array of raised ribs 274 disposed on a substantially planar base 276 and surrounded by an outer rim 278. The raised ribs 274 are preferably arranged in an orthogonal pattern that may include a plurality of longitudinal main raised ribs 280 and a plurality of lateral main raised ribs 282. The pair of seat tracks 72 of the chair assembly 52 of the adjustable seating assembly 24 are preferably mounted to the substantially planar base 276 and disposed proximate one of the longitudinal main raised ribs 280 and between the two lateral main raised ribs 282, as depicted in FIG. 18.

The circular disk 270, the circular pan 272, and the rotatable circular platform 204 are preferably operably coupled together and are rotatably mounted to the underbody 202 of the motor vehicle 20 as an integrated unit. That is, the circular disk 270 is preferably fixedly clamped to the recess 284 formed within the circular pan 272 via a central hub assembly 286. The rotatable circular platform 204 is in turn fixedly attached to the outer rim 278 of the circular disk 270 through fasteners 288 extending through bosses 290 disposed on a bottom surface 292 of the rotatable circular platform 204 and into the longitudinal and lateral main raised ribs 280, 282, as shown in FIGS. 18 and 19.

The circular disk 270, circular pan 272, and the rotatable circular platform 204 are rotatably coupled to the underbody 202 via a plurality of side clamps 294 fixedly attached to the underbody 202 that engage an annular side wall 296 of the circular pan 272 at regular intervals around about the outer periphery 298 within a channel 300 defined in each of the side clamps 294. As shown in FIG. 19, the underbody structure 200 further includes a plurality of lateral supports 295 arranged about the perimeter of the circular disk 270 and guiding rollers 302 integrated into and disposed beneath the circular pan 272 and above the underbody 202 of the motor vehicle 20 by which the circular disk 270, circular pan 272, and the rotatable circular platform 204 are supported.

Figure 18:
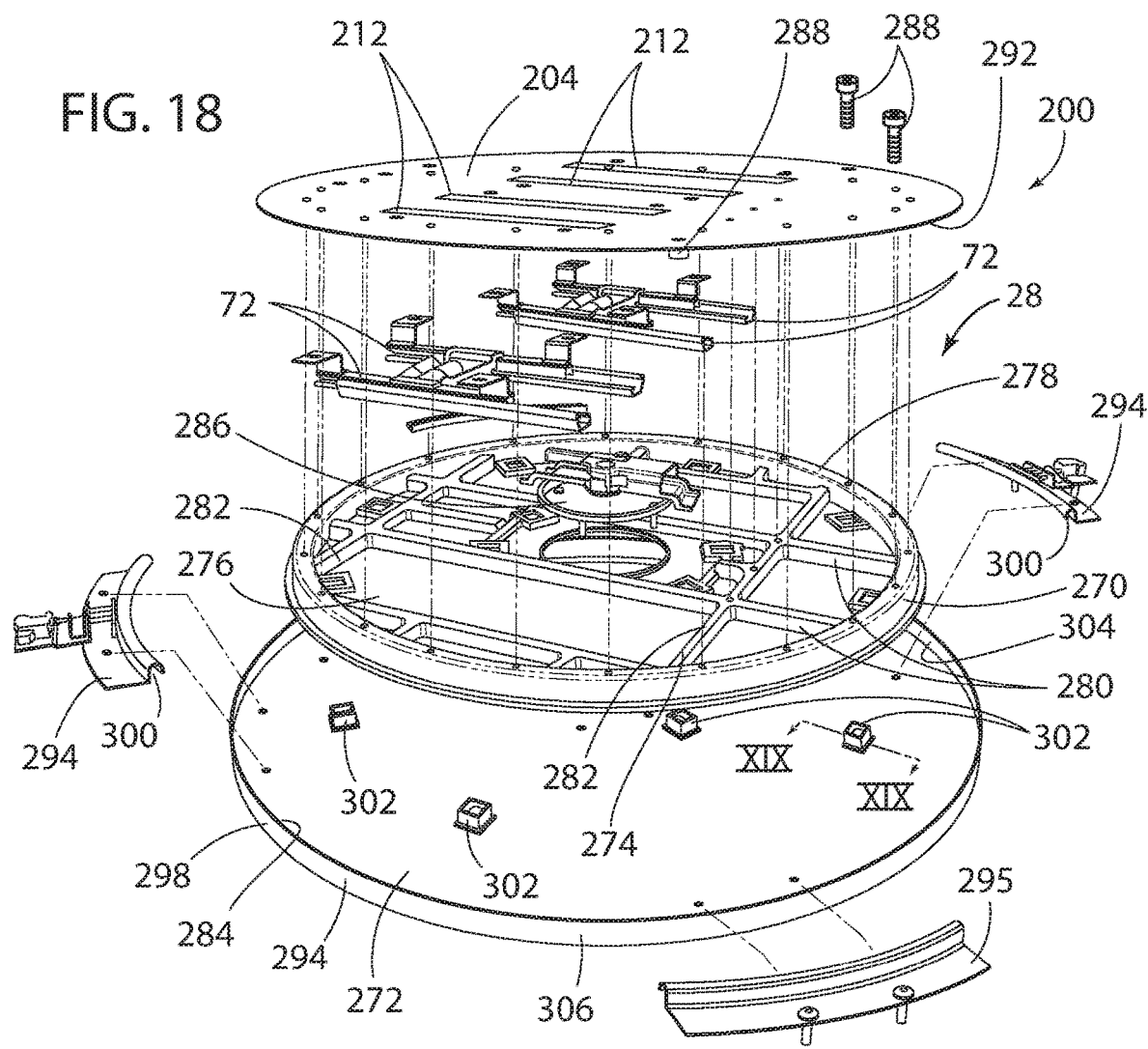
FIG. 18 is a front perspective view of the underbody structure according to a still further embodiment.

As shown in FIG. 18, the annular side wall 296 of the circular pan 272 defines an interior surface 304 that, in the event of a side impact as described above, is operably coupled with the outer rim 278 of the circular disk 270. An exterior surface 306 of the annular side wall 296 of the circular pan 272 is in turn also operably coupled with a side structure 228 of the motor vehicle 20.

Thus, in the event that a side load F is imposed upon the motor vehicle 20, the load is transferred from the side structure 228 of the motor vehicle 20 to the annular side wall 296 of the circular pan 272 and thus to the circular disk 270. Due to their circular configuration, the circular pan 272 and the circular disk 270 transfer the load around their outer periphery 298 and outer rim 278, respectively, and across the longitudinal main raised ribs 280 and the lateral main raised ribs 282. Thus, the presence of the circular disk 270, which is operably coupled with the interior surface 304 of the annular side wall 296 of the recess 284 formed in the circular pan 272, reinforces the outer periphery 298 of the circular pan 272 to maintain the structural integrity of the underbody 202 of the motor vehicle 20, regardless of the rotational position of the rotatable turntable 28 and the direction in which the adjustable seating assembly 24 may be facing.

In both embodiments of the underbody structure 200 described above, the brace 210 extends beneath and substantially across the diameter of the rotatable circular platform 204 of the rotatable turntable 28. Both embodiments also include a recess 206, 284 within which the brace 210 is received, the recess 206, 284 having a side wall 222, 296 defining an interior surface 224, 304 operably coupled with the brace 210 and an exterior surface 226, 306 operably coupled with a side structure 228 of the motor vehicle 20. In the first embodiment of the underbody structure 200 described above, the recess 206 is constructed as a fixed recess 206 having an annular side wall 222 defining the interior surface 224 operably coupled with the truss-like structure 230 and the exterior surface 226 operably coupled with the side structure 228 of the motor vehicle 20. In the second embodiment of the underbody structure 200 described above, the recess is constructed as the circular pan 272 rotatably coupled with the rotatable turntable 28 and the circular disk 270 and having an annular side wall 296 defining the interior surface 304 operably coupled with the brace 210 and the exterior surface 306 operably coupled with the side structure 228 of the motor vehicle 20. In both embodiments, an underbody structure 200 is disclosed that effectively provides reinforcement of the underbody 202 of the motor vehicle 20 as described herein.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An underbody structure for supporting an adjustable seating assembly for a motor vehicle comprising:

a rotatable turntable operably coupled to an underbody of the motor vehicle; and a brace operably coupled with the rotatable turntable and the underbody of the motor vehicle and extending substantially across the rotatable turntable;

wherein the adjustable seating assembly is operably coupled to the brace and to the underbody of the motor vehicle and the rotatable turntable comprises a rotatable circular platform disposed above a recess within which the brace is received, the recess having an annular side wall defining an interior surface operably coupled with the brace and an exterior surface operably coupled with a side structure of the motor vehicle.

2. The underbody structure of claim 1, wherein the side structure of the motor vehicle is a rocker panel or a runner.

3. The underbody structure of claim 1, wherein the brace comprises a truss-like structure.

4. The underbody structure of claim 3, wherein the truss-like structure is comprised of extruded aluminum tubes.

5. The underbody structure of claim 3, wherein the brace further comprises a central hub through which a bolt extends to operably couple the brace to the underbody of the motor vehicle and to which the truss-like structure is attached.

6. The underbody structure of claim 5, wherein the central hub of the brace further comprises a fixed inner race and a rotatable outer race between which are disposed a plurality of ball bearings by which the brace is operably coupled with the underbody of the motor vehicle, and wherein the truss-like structure is attached to the rotatable outer race.

7. The underbody structure of claim 6, further comprising guiding rollers disposed beneath the truss-like structure and above the underbody of the motor vehicle by which the truss-like structure and rotatable circular platform are supported.

8. The underbody structure of claim 3, wherein the truss-like structure comprises a pair of hexagonal sections, each one of the pair of hexagonal sections being disposed on opposed sides of the central hub and the adjustable seating assembly further comprises a pair of seat tracks operably coupled with and extending orthogonally between opposed segments of an intermediate portion of the truss-like structure, wherein the pair of seat tracks are rigidly fixed to the truss-like structure.

9. The underbody structure of claim 3, wherein the truss-like structure extends between a central hub and a central bolt at a center of rotation of the rotatable turntable at a proximate portion of the truss-like structure and an interior surface of an annular side wall of a recess at a distal portion of the truss-like structure, and an exterior surface of the annular side wall is operably coupled with a side structure of the motor vehicle.

10. The underbody structure of claim 3, wherein the truss-like structure comprises a central portion, an intermediate portion, and an exterior portion, wherein:

the intermediate portion is operably coupled with the adjustable seating assembly, the adjustable seating assembly comprising a pair of seat tracks in spaced parallel relation with each other and the intermediate portion comprising a first pair of tubular members in spaced parallel relation with each other and in orthogonal relation to the pair of seat tracks;

the central portion extends from a central hub rotatably coupled with a fixed central bolt to a first of the pair of seat tracks and comprises a second pair of tubular members each radially extending from the central hub to the first of the pair of seat tracks; and the exterior portion extends from an external side structure of the motor vehicle to a second of the pair of seat tracks and comprises a third pair of tubular members each extending from a common apex of the truss-like structure proximate an exterior side structure of the motor vehicle to the second of the pair of seat tracks.

11. The underbody structure of claim 10, wherein the truss-like structure comprises a pair of trusses, each of which is operably coupled with the adjustable seating assembly, each of which is disposed on opposed sides of the central hub, and each of which is aligned across the rotatable turntable.

12. The underbody structure of claim 1, wherein the brace comprises a circular disk disposed below a rotatable circular platform and above a pan within which the circular disk is received.

13. The underbody structure of claim 12, wherein the circular disk comprises an array of raised ribs disposed on a substantially planar base and the raised ribs on the circular disk are arranged in an orthogonal pattern that comprises a plurality of longitudinal main raised ribs and plurality of lateral main raised ribs, and wherein the adjustable seating assembly comprises a pair of seat tracks mounted to the substantially planar base and disposed proximate one of the longitudinal main raised ribs and one of the lateral main raised ribs.

14. The underbody structure of claim 13, wherein the pan, the circular disk, and the rotatable circular platform are operably coupled and rotatably mounted to the underbody of the motor vehicle, and the pan is circular and has an annular side wall defining an interior surface operably coupled with the circular disk and an exterior surface operably coupled with a side structure of the motor vehicle.

15. An underbody structure for supporting an adjustable seating assembly for a motor vehicle comprising:

a brace operably coupled with an underbody of the motor vehicle;

a rotatable turntable operably coupled to the brace and the underbody of the motor vehicle and further comprising a circular platform upon which the adjustable seating assembly is disposed, wherein the brace extends beneath and substantially across a diameter of the circular platform of the rotatable turntable; and a circular recess within which the brace is received, the circular recess having an annular side wall defining an interior surface operably coupled with the brace and an exterior surface operably coupled with a side structure of the motor vehicle.

16. The underbody structure of claim 15, wherein the circular platform comprises a pair of parallel slots extending therethrough and through which a pair of seat tracks of the adjustable seating assembly extend and whereby the adjustable seating assembly is configured to slidably actuate between a first extended position and a second rearward-actuated position regardless of a rotational position of the rotatable turntable.

17. An underbody structure for supporting a plurality of adjustable seating assemblies for a motor vehicle comprising:

a rotatable turntable operably coupled to a brace and an underbody of the motor vehicle and further comprising a circular platform upon which the plurality of seating assemblies are disposed, wherein the brace extends beneath and substantially across a diameter of the circular platform of the rotatable turntable; and a recess within which the brace is received, the recess having a side wall defining an interior surface operably coupled with the brace and an exterior surface operably coupled with a side structure of the motor vehicle.

18. The underbody structure of claim 17, wherein the brace comprises a truss-like structure and the recess comprises a fixed circular recess having an annular side wall defining the interior surface operably coupled with the truss-like structure and the exterior surface operably coupled with a side structure of the motor vehicle.

19. The underbody structure of claim 17, wherein the brace comprises a circular disk and the recess comprises a circular pan, the circular disk being disposed below the rotatable circular platform and above the circular pan within which the circular disk is received, and the circular pan being rotatably coupled with the rotatable turntable and the circular disk and further comprising an annular side wall defining the interior surface operably coupled with the brace and the exterior surface operably coupled with a side structure of the motor vehicle.

\* \* \* \* \*